United States Patent
Suzuki et al.

(10) Patent No.: US 8,809,740 B2
(45) Date of Patent: Aug. 19, 2014

(54) TWO-ELECTRODE WELDING METHOD

(75) Inventors: Reiichi Suzuki, Fujisawa (JP); Kei Yamazaki, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 4 days.

(21) Appl. No.: 13/471,872

(22) Filed: May 15, 2012

(65) Prior Publication Data

US 2012/0312795 A1 Dec. 13, 2012

(30) Foreign Application Priority Data

Jun. 9, 2011 (JP) .................... 2011-128868

(51) Int. Cl.
| | |
|---|---|
| B23K 33/00 | (2006.01) |
| B23K 35/30 | (2006.01) |
| B23K 9/09 | (2006.01) |
| B23K 9/10 | (2006.01) |
| B23K 9/12 | (2006.01) |
| B23K 9/28 | (2006.01) |
| B23K 9/04 | (2006.01) |

(52) U.S. Cl.
USPC .............. 219/137 R; 219/137 PS; 219/137.2; 219/76.14

(58) Field of Classification Search
USPC ................. 219/76.14, 137 R, 137 PS, 137.2
See application file for complete search history.

(56) References Cited

U.S. PATENT DOCUMENTS

| | | | | |
|---|---|---|---|---|
| 3,875,363 A | * | 4/1975 | Arikawa et al. | ............. 219/73.1 |
| 4,336,441 A | * | 6/1982 | Godai et al. | .......... 219/137 WM |
| 5,124,527 A | | 6/1992 | Takano et al. | |
| 5,580,475 A | * | 12/1996 | Sakai et al. | ............. 219/145.22 |
| 2003/0062355 A1 | | 4/2003 | Ikegami et al. | |
| 2008/0083716 A1 | * | 4/2008 | Shigeyoshi | ............. 219/125.12 |
| 2009/0308855 A1 | | 12/2009 | Yoshima | |
| 2010/0301030 A1 | * | 12/2010 | Zhang et al. | ............... 219/130.1 |
| 2011/0036814 A1 | * | 2/2011 | Ishigami et al. | ............... 219/73 |
| 2011/0259853 A1 | | 10/2011 | Yamazaki et al. | |

FOREIGN PATENT DOCUMENTS

| | | | | |
|---|---|---|---|---|
| JP | 2-169183 | | 6/1990 | |
| JP | 02169183 A | * | 6/1990 | ............. B23K 9/29 |
| JP | 3-275280 | | 12/1991 | |
| JP | 2610819 B2 | | 5/1997 | |
| JP | 3185071 B2 | | 7/2001 | |
| JP | 2003-53545 | | 2/2003 | |
| JP | 2004-1033 | | 1/2004 | |

(Continued)

*Primary Examiner* — Tu B Hoang
*Assistant Examiner* — Michael Hoang
(74) *Attorney, Agent, or Firm* — Oblon, Spivak, McClelland, Maier & Neustadt, L.L.P.

(57) ABSTRACT

In a two-electrode welding method of the present invention, a leading electrode is used to perform gas-shielded arc welding and a trailing electrode is an energized filler. A trailing electrode wire protrudes from a guide lead or guide tip and is energized from an energizing tip. The distance between a welding surface and the energizing tip is 100 mm or more and 1500 mm or less. The distance between electrodes is 10 mm or less. The electric current of the leading electrode is 250 A or more, and the electric current of the trailing electrode is 10 A or more and 50% or less of the electric current of the leading electrode. The feeding speed of the trailing electrode wire is 20% or more and 50% or less of the feeding speed of the leading electrode wire.

6 Claims, 5 Drawing Sheets

(56) References Cited

FOREIGN PATENT DOCUMENTS

| | | |
|---|---|---|
| JP | 2004-148369 | 5/2004 |
| JP | 2006-247695 | 9/2006 |
| JP | 2008087045 A * | 4/2008 |
| JP | 4089755 B2 | 5/2008 |
| JP | 4151777 B2 | 9/2008 |
| WO | WO 02/18086 A1 | 3/2002 |

* cited by examiner

TWO-ELECTRODE WELDING METHOD

BACKGROUND OF THE INVENTION

1. Field of the Invention

The present invention relates to a gas-shielded tandem welding method and particularly to a two-electrode welding method that has high deposition efficiency per heat input, has good mechanical properties of a weld metal, and can decrease the amount of spatters by significantly reducing arc interference between electrodes, which has been an unavoidable problem.

2. Description of the Related Art

Gas-shielded arc welding is the most general-purpose and widespread welding technique at present, but higher efficiency has been required. Gas-shielded arc welding is broadly divided into consumable electrode welding methods such as a metal active gas (MAG) welding method and a metal inert gas (MIG) welding method and non-consumable electrode welding methods such as a tungsten inert gas (TIG) welding method. Among these welding methods, MAG and MIG welding methods are overwhelmingly excellent in terms of efficiency, and the efficiency has been improved in both the methods. Herein, to reduce the number of passes by increasing the deposition amount, which is the most effective way for achieving high efficiency, a larger amount of welding wire needs to be fed and melted in a short time.

When the feeding speed of a single-electrode wire is increased in MAG and MIG welding methods, the wire is excessively heated and is thus melted before reaching an arc. Consequently, hanging droplets become unstable and a large amount of spatters is generated. Furthermore, when the number of revolutions of a feeding roller is increased, the feeding speed itself becomes unstable, which affects an arc. Moreover, an increase in electric current excessively increases an arc force and a molten pool is dug deeply, resulting in a flow defect. This poses problems such as cause of undercut and humping defects and degradation of bead spread. Therefore, there is a limitation to increase the feeding speed.

Thus, welding methods described below have been conventionally performed.

[1-1: Tandem Arc Welding]

A tandem arc welding method in which the total amount of wire melted is increased by generating arcs using two electrodes has been proposed and is now widespread (e.g., refer to Japanese Unexamined Patent Application Publication Nos. 2004-1033, 2003-053545, and 2006-247695 and Japanese Patent No. 4089755). However, such a welding method in which two electrodes are close to each other poses a large problem of arc interference. A magnetic field in a rotational direction is generated around a conducting wire through which an electric current passes. When two electrodes come close to each other, the mutual interference produces an attractive force in the case where the polarities of electric currents are the same or a repulsive force in the case where the polarities are opposite. Therefore, the directions of the arcs are also affected and the directivity thereof becomes unstable. Consequently, droplets moving from a wire to a molten pool fly out due to the effect and a large amount of spatters is generated. To address such a problem, some measures have been taken, such as use of a pulsed current, use of an optimum phase, and shortening of an arc length by voltage adjustment.

However, such measures are not fundamental solutions and the problem of generation of spatters has not been solved yet. If the distance between electrodes is increased, arc interference is reduced and thus the amount of spatters is decreased. However, this poses problems in that a curved material to be welded cannot be tracked, it makes difficult to enter a narrow portion because of the upsizing of a welding apparatus, and a lack-of-welding area is increased at the beginning and end of welding. In terms of ease of operation, the distance between electrodes is desirably small because a welding apparatus with a small size can be provided. Furthermore, if an electric current of one of the two electrodes is decreased, the effect on the arc of the electrode having a high electric current is decreased and the amount of spatters is decreased. However, since the arc of the electrode having a low electric current has a weak arc force and is subjected to a strong arc force exerted by the electrode having a high electric current, the amount of spatters may be increased. Therefore, the total amount of spatters is not decreased. As described above, in the tandem arc welding method, the problem of spatters generated by arc interference has not been solved yet.

In view of an influence exerted on the performance of a weld metal, the tandem arc welding method is also not preferred. That is, since the total amount of heat provided to a base metal is large due to the generation of arcs from both electrode wires, the cooling rate of a weld metal portion is decreased. As a result, the size of crystal structures increases and thus the strength, toughness, and the like easily decrease.

[1-2: Hot Wire TIG Welding]

In a TIG welding method in which a tungsten electrode that generates an arc is separated from a filler wire, if an arc current of TIG is increased to increase the melting rate of the wire, the front end of the tungsten electrode is melted by heating and damaged. Therefore, the melting energy cannot be significantly increased. To make it easy to melt a filler serving as the wire, it has been disclosed that a wire or welding rod that is normally not energized is energized and the temperature of the wire or welding rod is increased by electric resistance heating to improve the melting property (e.g., refer to Japanese Patent Nos. 2610819 and 4151777). Herein, TIG welding has an advantage of generating almost no spatters. However, since the arc current of TIG is not so high, the TIG arc easily loses its directivity due to magnetic interference caused by energizing the filler. Consequently, the TIG arc becomes unstable and lack of penetration readily occurs. In addition, since the TIG welding method uses a non-consumable electrode, the deposition rate is fundamentally low. Even if the filler is easily melted, the efficiency of TIG welding cannot compete with the efficiency of MAG or MIG welding. Thus, a further increase in the efficiency of MAG or MIG welding has been demanded.

[1-3: Hot Wire MAG Welding]

A technology in which a technique of using a filler metal in TIG welding in the form of an energized filler is applied to MAG or MIG welding has been proposed (e.g., refer to Japanese Unexamined Patent Application Publication Nos. 2004-148369 and 2-169183 and Japanese Patent No. 3185071). Since a filler is melted in a molten pool, droplets are not formed in an arc and thus spatters are not generated regardless of the degree of energizing current. Thus, it is desired that the melting rate is increased by further increasing the temperature of a filler wire through application of high energizing current. However, as in the case of TIG welding, filler energizing current affects the arc of a leading electrode. Even though spatters are not generated from both electrodes unlike the tandem arc welding, the amount of spatters generated in an arc electrode is increased. To address such a problem, some measures have been taken such as use of a pulse for an arc electrode and an energized filler electrode, but such measures are not fundamental solutions. An increase in the heat input is suppressed compared with the tandem arc welding because the filler electrode does not generate an arc. However, if the filler energizing current is increased to achieve high efficiency, the total amount of heat is increased and the strength, toughness, and the like are easily decreased.

[1-4: Double Wire Welding]

In the hot wire MAG welding, one of the two electrodes is employed as an energized filler and an electric current is supplied to the arc electrode and filler electrode using two independent welding machines. Herein, a technology similar to the technology of hot wire MAG welding has been proposed (e.g., refer to Japanese Unexamined Patent Application Publication No. 3-275280 and International Publication No. WO02/018086). In this technology, instead of the supply of an electric current with two welding machines, part of an arc current of a leading electrode is shunted to an energized filler serving as a trailing electrode using a single welding machine. Thus, welding is performed with a simple apparatus. However, also in this method, an arc of the leading electrode is subjected to interference and spatters are generated. In addition, since the electric current shunted to the filler serving as the trailing electrode is not a fixed value but a value proportional to the electric current of the leading electrode, the trailing electrode is directly affected by the fluctuation of the electric current of the leading electrode. Therefore, the electric current is not kept constant and becomes unstable, which easily causes melting defects of the filler. In principle, the polarities of electric currents of the arc electrode serving as the leading electrode and the filler electrode serving as the trailing electrode are opposite. For example, when the wire has a "positive" polarity and the base metal has a "negative" polarity in the leading electrode, the wire has a "negative" polarity and the base metal has a "positive" polarity in the trailing electrode.

When the polarities of electric currents are opposite as described above, an interference force with which the arcs of the electrodes repel each other is exerted and the arc of the leading electrode faces forward in a welding direction. This shifts a molten pool immediately below the arc forward and the digging force is increasingly reduced. Consequently, incomplete penetration easily occurs. In addition, since spatters do not enter the molten pool, but scatter to an unwelded portion in front, the amount of spatters attached to a work is increased. As in the hot wire MAG welding, an increase in the heat input is suppressed compared with the tandem arc welding because the filler electrode does not generate an arc. However, if the filler energizing current is increased to achieve high efficiency, the total amount of heat is increased and the strength, toughness, and the like are easily decreased.

[1-5: Type of Welding Wire]

In the case of the above-described welding method in which a single molten pool is formed with two electrodes, the same welding wire is generally used for the two electrodes in terms of ease of operation. However, in the case of a two-electrode method in which the leading electrode is an arc electrode and the trailing electrode is a filler electrode, the function required for the leading electrode and the function required for the trailing electrode are different from each other. Consequently, if the same welding wire is used, some problems may be caused. For example, when both an arc electrode wire and a filler electrode wire are solid wires, the wire of the filler electrode is not easily melted and an unmelted wire is easily generated. Furthermore, since the filler electrode does not generate an arc, an oxidation reaction caused by contact between droplets (wire-melted liquid) and atmosphere gas generated in a high-temperature arc space substantially does not occur (refer to FIGS. 5A and 5B). Thus, when a wire having a composition that is optimized for an arc electrode by containing a reducing element with a strong oxygen affinity, such as Ti, is employed as a wire of the filler electrode, the process "a reducing element is oxidized and then discharged in the form of slag" is not undergone and thus an excessive number of inclusions (Ti particles) are left in a weld metal and the toughness significantly degrades.

To increase the strength and toughness of the weld metal, in general, elements such as Mo and B that improve hardenability need to be added from a wire. However, if these elements are added to a solid wire, the wire drawability is decreased. Therefore, annealing and pickling need to be repeatedly performed in the production process, which increases the cost. Such elements can be added without affecting the wire drawability if a flux-cored wire is employed. However, when such a flux-cored wire is used for the arc electrode, the depth of penetration is disadvantageously decreased compared with the case of a solid wire.

SUMMARY OF THE INVENTION

As described above, various welding methods concerning gas-shielded arc welding have been conventionally disclosed. However, each of the welding methods has the problems described above. There is also a problem concerning the type of welding wire. Accordingly, the development of a welding method that solves the problems above has been demanded.

The present invention provides a technology developed in view of the foregoing. It is an object of the present invention to provide a novel welding method that can achieve all matters such as (a) a high deposition rate realized by using two consumable electrodes, (b) a decrease in the total amount of spatters realized by reducing arc interference, (c) an improvement in ease of operation realized by shortening the distance between electrodes, (d) complete wire melting, (e) formation of a high-toughness weld metal, that is, a weld metal having a fine and sound crystal structure, and (f) low heat input and high deposition efficiency.

It is also an object of the present invention to provide a welding method that (g) can provide a sound weld metal including a small number of incursions, (h) can employ a cheap wire, and (i) can achieve deep penetration.

A two-electrode welding method according to the present invention that uses two wire-shaped consumable electrodes to which an electric current is supplied from two independent welding sources includes forming a molten pool with a leading electrode wire of a leading electrode that precedes in a welding direction and inserting a trailing electrode wire of a trailing electrode that succeeds in the welding direction into the molten pool to form a single molten pool, wherein the leading electrode is used to perform gas-shielded arc welding in which the leading electrode wire is melted by generating an arc; the trailing electrode is an energized filler in which the temperature of the trailing electrode wire is increased by electric resistance heating through energization without generating an arc, and after the trailing electrode wire is inserted into the molten pool, the trailing electrode wire is melted through heat conduction of the molten pool; the trailing electrode includes a guide lead or guide tip having no energizing function but only a function of determining a position of the molten pool into which the trailing electrode wire is to be inserted; the trailing electrode wire protrudes from the guide lead or guide tip and is energized from an energizing tip disposed at a position on the welding machine side of the guide lead or guide tip; a distance $D_L$ between a welding surface and a front end of the energizing tip on the welding surface side is 100 mm or more and 1500 mm or less; a distance $D_E$ between the leading electrode and the trailing electrode on the welding surface is 10 mm or less; an electric current of the leading electrode is 250 A or more; an electric current of the trailing electrode is 10 A or more and 50% or less of the electric current of the leading electrode; and a feeding speed of the trailing electrode wire is 20% or more and 50% or less of a feeding speed of the leading electrode wire.

According to the welding method, by setting the distance $D_L$ between the welding surface and the front end of the energizing tip on the welding surface side to be 100 mm or more and 1500 mm or less in the two-electrode welding method in which the leading electrode is an arc electrode and the trailing electrode is a filler electrode, the amount of electric resistance heating is increased even at a low electric current without causing any problem on wire feeding. Consequently, the trailing electrode wire is sufficiently heated. By setting the distance $D_E$ between electrodes to be 10 mm or less, the melting rate of the trailing electrode wire is increased. By setting the electric current of the leading electrode to be 250 A or more, an arc force that provides a sufficient thickness of the molten pool for melting the trailing electrode wire is obtained without increasing the amount of spatters. By setting the electric current of the trailing electrode to be 10 A or more, the trailing electrode wire is completely melted without causing uneven heating. By setting the electric current of the trailing electrode to be 50% or less of the electric current of the leading electrode, the arc of the leading electrode is not easily subjected to magnetic interference generated by the trailing electrode and thus the generation of spatters is suppressed. By setting the feeding speed of the trailing electrode wire to be 20% or more of the feeding speed of the leading electrode wire, the cooling effect of the molten pool becomes sufficient and the toughness of a weld metal is improved. By setting the feeding speed of the trailing electrode wire to be 50% or less of the feeding speed of the leading electrode wire, generation of an unmelted trailing electrode wire is suppressed.

In the two-electrode welding method according to the present invention, current polarities of both the leading electrode wire and the trailing electrode wire are preferably positive or negative with respect to a base metal.

In this case, the generation of spatters is further reduced and the depth of penetration is increased.

Preferably, the leading electrode wire is a solid wire or a flux-cored wire, the trailing electrode wire is a flux-cored wire, and the flux ratio of the trailing electrode wire is 10% or more by mass.

By employing a flux-cored wire as the trailing electrode wire and setting the flux ratio to be 10% or more by mass, the trailing electrode wire is easily melted.

Assuming that the Ti amount (% by mass) in a composition of the leading electrode wire is represented by $[Ti]_L$ and the Ti amount (% by mass) in a composition of the trailing electrode wire is represented by $[Ti]_T$, a value of $[Ti]_L + 3 \cdot [Ti]_T$ is preferably 0.10 or more and 0.50 or less.

In this case, an excessive number of inclusions are not present in the weld metal and the toughness of the weld metal is improved.

The $[Ti]_L$ is preferably 0.10% or more and 0.50% or less by mass.

In this case, the generation of spatters can be further suppressed.

The trailing electrode wire preferably contains at least one of B: 0.0020% or more and 0.0500% or less by mass and Mo: 0.10% or more and 1.00% or less by mass relative to the total mass of the wire.

In this case, the strength and toughness of the weld metal can be increased without increasing the production cost.

According to the present invention, the deposition rate can be increased and the welding efficiency can be improved. Furthermore, the amount of spatters generated can be decreased and a weld metal having high toughness can be obtained. Moreover, complete wire melting can be achieved and the downsizing of a welding apparatus can be realized.

In addition, by employing a preferred form, deep penetration can be achieved and a cheap wire can be employed.

DESCRIPTION OF THE PREFERRED EMBODIMENTS

Embodiments of the present invention will now be described in detail.

A two-electrode welding method according to the present invention uses two wire-shaped consumable electrodes to which an electric current is supplied from two independent welding sources. The two consumable electrodes are constituted by a leading electrode (hereinafter may be referred to as "an arc electrode") that precedes in the welding direction and a trailing electrode (hereinafter may be referred to as "a filler electrode") that succeeds in the welding direction. The two-electrode welding method is a welding method in which a molten pool is formed with a leading electrode wire of the leading electrode and a trailing electrode wire of the trailing electrode is inserted into the molten pool, whereby a single molten pool is formed.

An outline of a welding apparatus used to perform the two-electrode welding method of the present invention will now be described.

[Welding Apparatus]

Figure 1A:
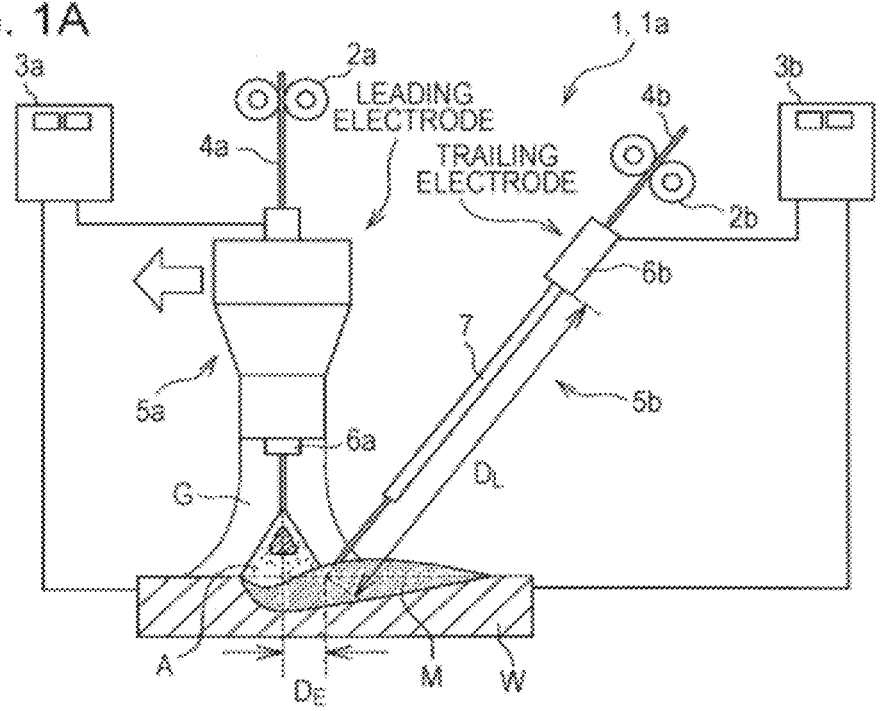
FIG. 1A schematically shows an exemplary outline of a welding apparatus used to perform a two-electrode welding method of the present invention, the welding apparatus including a trailing electrode equipped with a guide lead.
Figure 1B:
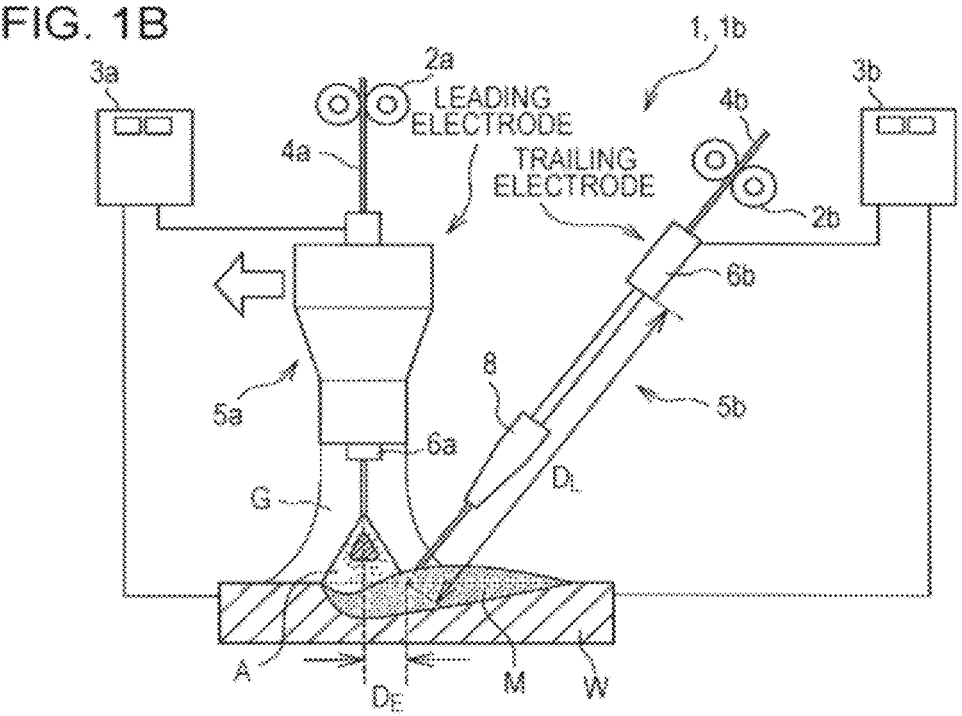
FIG. 1B schematically shows an exemplary outline of a welding apparatus used to perform a two-electrode welding method of the present invention, the welding apparatus including a trailing electrode equipped with a guide tip.

As shown in FIGS. 1A and 1B, each of welding apparatuses 1 (1a and 1b) includes, as main components, feeding rollers 2a and 2b, welding sources (welding machines) 3a and 3b, a leading electrode torch 5a that supplies a leading electrode wire 4a from its front end, and a trailing electrode torch 5b that supplies a trailing electrode wire 4b from its front end.

The feeding roller 2a is a device used for feeding the leading electrode wire 4a to the leading electrode torch 5a. The feeding roller 2b is a device used for feeding the trailing electrode wire 4b to the trailing electrode torch 5b. Although not shown in the drawings, the feeding rollers 2a and 2b are connected to the welding sources 3a and 3b, respectively, through a welding controller. When the welding controller outputs a command signal to the welding source 3a, the feeding roller 2a is operated by the welding source 3a and the leading electrode wire 4a is fed to the leading electrode torch 5a. When the welding controller outputs a command signal to the welding source 3b, the feeding roller 2b is operated by the welding source 3b and the trailing electrode wire 4b is fed to the trailing electrode torch 5b.

The welding source 3a operates the feeding roller 2a that feeds the leading electrode wire 4a by outputting a rotation control signal and supplies a welding current to the leading electrode wire 4a. The welding source 3b operates the feeding roller 2b that feeds the trailing electrode wire 4b by outputting a rotation control signal and supplies a filler current to the trailing electrode wire 4b.

The leading electrode torch 5a supplies the leading electrode wire 4a to a base metal (member to be welded) W through the operation of the feeding roller 2a. An energizing tip 6a is disposed inside the leading electrode torch 5a, and a welding current sent from the welding source 3a is supplied to the leading electrode wire 4a through the energizing tip 6a.

The trailing electrode torch 5b supplies the trailing electrode wire 4b to a molten pool M through the operation of the feeding roller 2b. The trailing electrode torch 5b includes a guide lead 7 or a guide tip 8 having no energizing function but only a function of determining a position of the molten pool M into which the trailing electrode wire 4b is to be inserted. The trailing electrode wire 4b protrudes from the welding surface side of the guide lead 7 or guide tip 8. An energizing tip 6b is disposed on the welding machine side of the guide lead 7 or guide tip 8, that is, on the side (on the welding source 3b side in FIGS. 1A and 1B) of the trailing electrode opposite the welding surface side. A filler current sent from the welding source 3b is supplied to the trailing electrode wire 4b through the energizing tip 6b.

The two-electrode welding method according to this embodiment includes, in a broad manner, a first step of forming a molten pool M with the leading electrode wire 4a and a second step of inserting the trailing electrode wire 4b into the molten pool M.

In the first step, for the purpose of formation of the molten pool M, an arc A is generated by the leading electrode between the leading electrode wire 4a and the base metal W using a shield gas G to melt the leading electrode wire 4a. Thus, gas-shielded arc welding is performed.

In the second step, the trailing electrode wire 4b heated through energization is inserted into the molten pool M. The trailing electrode is an energized filler and does not generate an arc. In the trailing electrode, first, the temperature of the trailing electrode wire 4b is increased by electric resistance heating through energization. After the trailing electrode wire 4b is inserted into the molten pool M, the trailing electrode wire 4b is melted through the heat conduction of the molten pool M.

Through these two steps, a single molten pool is formed with the two consumable electrodes.

In the present invention, when the two-electrode welding method is performed, the following conditions are specified. That is, the distance $D_L$ (the energizing distance of the filler electrode) between the welding surface and the front end of the energizing tip 6b of the trailing electrode on the welding surface side is 100 mm or more and 1500 mm or less; the distance $D_E$ between the leading electrode and the trailing electrode on the welding surface is 10 mm or less; the electric current of the leading electrode is 250 A or more; the electric current of the trailing electrode is 10 A or more and is 50% or less of the electric current of the leading electrode; and the feeding speed of the trailing electrode wire 4b is 20% or more and 50% or less of the feeding speed of the leading electrode wire 4a. In a preferred form, desired type and composition of wires are selected.

The term "welding surface" herein indicates an upper surface of the base metal or lower-layer weld metal W (that is, an upper surface of a portion to be welded in the base metal or lower-layer weld metal W) as shown in FIGS. 1A and 1B. In a portion where the molten pool M has been formed, the term "welding surface" indicates a position on the plane that extends from the upper surface of the base metal or lower-layer weld metal W in a portion where the molten pool M is not formed. The term "energizing distance $D_L$" indicates the length from the front end of the energizing tip 6b on the welding surface side (on the base metal W side or on the lower-layer weld metal W side) to a position at which an extension line of the trailing electrode wire 4b in a direction toward the welding surface side intersects with the plane of the upper surface of the base metal or lower-layer weld metal W. The term "distance $D_E$ between electrodes" indicates the length from a position at which an extension line of the leading electrode wire 4a in a direction toward the welding surface side intersects with the plane of the upper surface of the base metal or lower-layer weld metal W to a position at which an extension line of the trailing electrode wire 4b in a direction toward the welding surface side intersects with the plane of the upper surface of the base metal or lower-layer weld metal W. Note that the term "base metal or lower-layer weld metal W" is used because, when a second layer or layers thereafter are formed, the surface of a weld metal below such layers serves as a new reference surface for the energizing distance $D_L$ of the filler electrode.

The details on specifying the above-described conditions in the present invention will be described, and then the reasons for the limitations and other matters will be described.

[2-1: Matter Concerning Spattering-Reduction Means]

Since there is a limitation to increase the amount of deposition using a single electrode wire, it is an essential technique to use two electrode wires. In order to increase the melting rate of wires, it is also an essential technique to perform heating through energization regardless of an arc electrode or a filler electrode. On these assumptions, the mutual interference of an electromagnetic force between the two electrodes adjacent to each other is considered to be inevitable. To minimize the effect, it is considered that two-stage means for (1) weakening the interference force and (2) not causing spattering even under interference needs to be taken. Regarding the means (2), since spatters are scattered droplets that move in an arc space, melting/supplying means that does not generate droplets, that is, a filler method that causes liquefaction in the end through the heat conduction of a molten pool is suitable. However, since an arc needs to be generated in at least one electrode to form a molten pool, the leading electrode is employed as a gas-shielded arc electrode and the trailing electrode is employed as a filler electrode. An electric current sent to each of the electrodes should be supplied from an independent welding source so that one of the electrodes is not affected by the other in terms of current stability. The description above is within the scope of the related art.

The leading electrode is an arc electrode and thus is subjected to magnetic interference. Therefore, the means for (1) weakening the interference force is required. As the electric current increases and the distance between electrodes decreases, the interference force is more strongly exerted. The distance $D_E$ between electrodes is physically as small as possible in order to track a curved weld line. To produce such an effect, a decrease in electric current is essential. To achieve this, the effect of a conventional contact tip is produced with two units described below, whereby the energizing distance $D_L$ of the filler electrode was markedly increased to 100 mm or more from 20 to 30 mm in the past. As the energizing distance $D_L$ increases, the electrical resistance increases and a filler wire can be heated to near its melting point with a low electric current. When the electric current is decreased, the distance $D_E$ between electrodes can also be decreased. This allows the distance $D_E$ between electrodes to decrease to 10 mm or less in the present invention from 15 to 40 mm in the past.

Specific means for increasing the energizing distance $D_L$ is as follows. Conventional contact tips have two functions of (1) energization and (2) fixing a wire target position. If the energizing distance $D_L$ is increased without taking any measure, the distance between the front end of the tip and the base metal is increased and thus the wire target position is not stably fixed due to a bend of the wire. As a result, shape defects or incomplete penetration such as a meandering bead occurs. In contrast, in the present invention, such means for increasing the energizing distance $D_L$ is achieved by dividing a conventional contact tip into two units having different functions, such as (1) a guide lead or guide tip having no energizing function but only a function of fixing a wire target position and (2) an energizing tip having no function of fixing a wire target position but only an energizing function.

Figure 2:
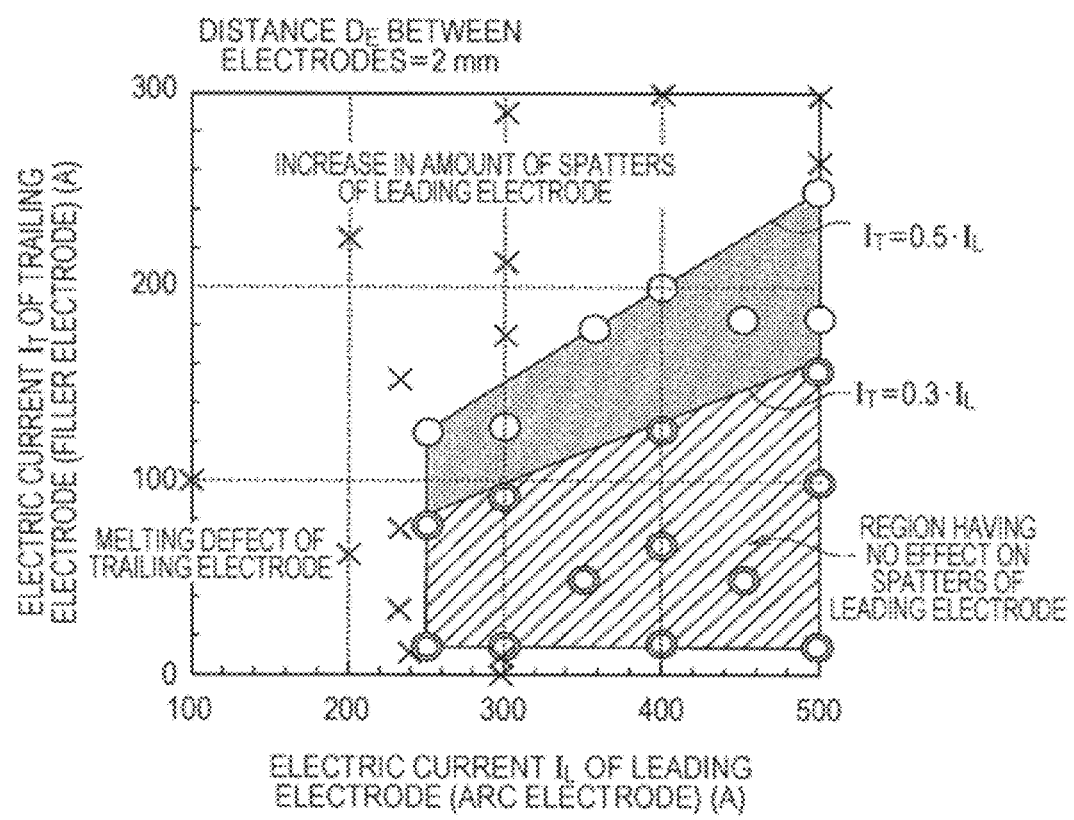
FIG. 2 is a graph showing the relationship between electric currents of a leading electrode and the trailing electrode.

The lower limit of an electric current of the arc electrode serving as the leading electrode was found to be 250 A in consideration of good spattering property and an arc force that provides a sufficient thickness of the molten pool for melting the filler wire of the trailing electrode. Subsequently, the upper limit of a filler energizing current with which the arc of the leading electrode is not easily subjected to magnetic interference was found (refer to FIG. 2). It was found that the upper limit of a filler energizing current $I_T$, which was an electric current of the trailing electrode, needed to be 500 or less of an electric current $I_L$ of the leading electrode and was preferably 30% or less. Herein, at the points "⊚" and "○" in FIG. 2, the melting defect of the trailing electrode does not occur and the amount of spatters of the leading electrode is small. The amount of spatters is particularly small at the point of "⊚". At the point "x", an increase in the amount of spatters of the leading electrode and the melting defect of the trailing electrode occur.

A current polarity also has an influence on an arc. When an electric current passes through two adjacent electrodes in the same direction, the arcs of the electrodes attract each other due to the effect of directions of magnetic lines of force. When an electric current passes through two adjacent electrodes in opposite directions, the arcs repel each other. Therefore, when the leading electrode and the trailing electrode attract each other, spatters from the arc electrode are highly likely to enter the molten pool, resulting in a relatively small amount of scattered spatters. In contrast, when the leading electrode and the trailing electrode repel each other, all spatters from the arc electrode fly out forward along the weld line to become scattered spatters and thus adverse effects are significantly produced. Therefore, an electric current preferably passes through two electrodes in the same direction. Preferably, both of the two electrodes have a positive polarity or a negative polarity and the base metal has the opposite polarity. Furthermore, the droplets of the arc of the leading electrode are suitably made to grow into large droplets to prevent the droplets from flying out due to magnetic interference, which decreases the amount of spatters. This is achieved by containing 0.10 to 0.50% by mass of Ti in a wire for the arc electrode.

[2-2: Matter Concerning Complete Wire Melting]

Figure 3:
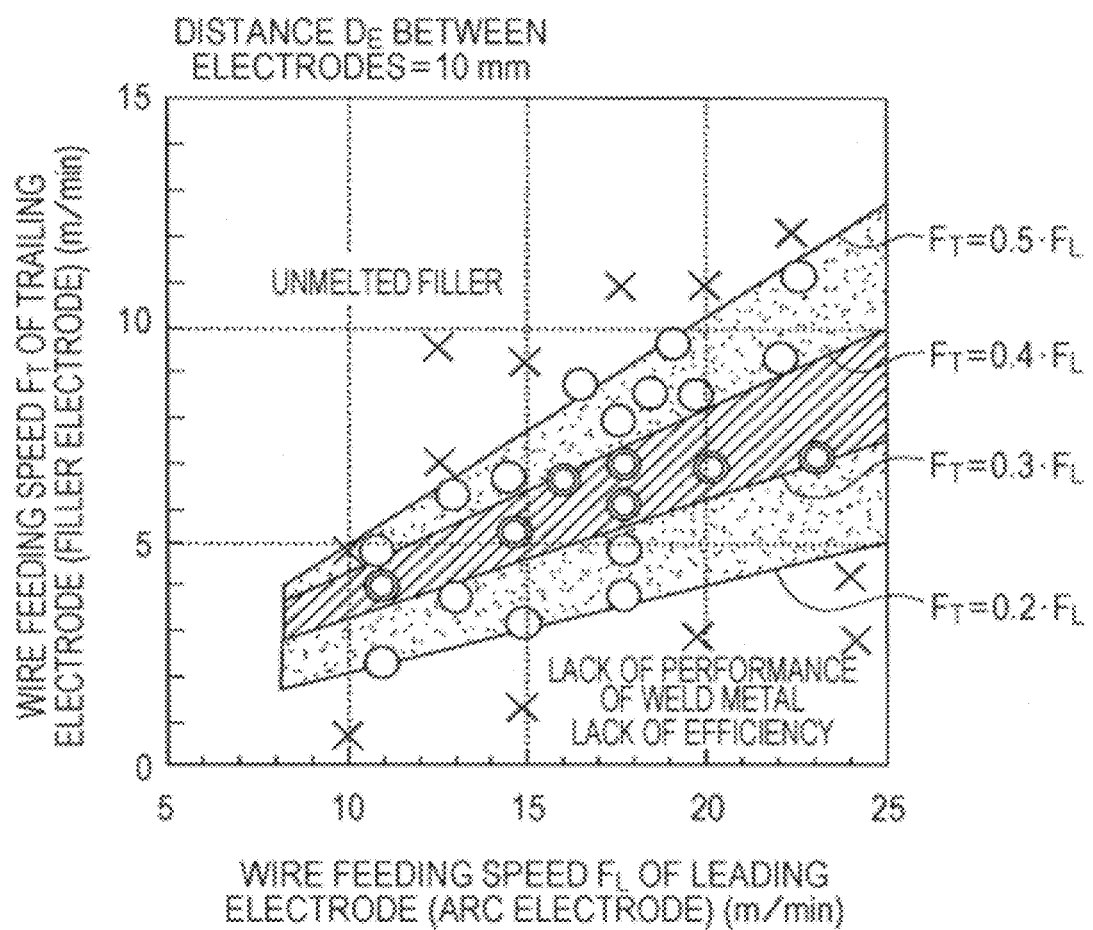
FIG. 3 is a graph showing the relationship between wire feeding speeds of the leading electrode and the trailing electrode.

A welding method in which a filler is inserted into a molten pool has a large problem. That is, since the melting of a wire cannot be visually confirmed unlike arc melting, the melting of a wire is not easily confirmed even if the wire feeding speed is excessively high, which causes a defect in which an unmelted wire is left in a weld metal. Since a filler melts in a molten pool when the temperature of the filler reaches its melting point due to heat conduction, the amount of heat held in the molten pool and the depth of the molten pool are important. Therefore, it is essential to (1) achieve a sufficient thickness of the molten pool for melting the filler of the trailing electrode and to (2) limit the filler feeding speed and energizing conditions so that the filler is completely melted. As a result of study, it was found that the condition (1) was achieved by setting the electric current of the arc electrode to be at least 250 A as described above and the condition (2) was achieved by setting the filler wire feeding speed of the trailing electrode to be 50% or less of the wire feeding speed of the leading electrode. If the wire feeding speed is more than 50%, an unmelted filler was generated with any combination between the filler energizing current $I_T$ and the energizing distance $D_L$ (refer to FIG. 3). Herein, at the points "⊚" and "○" in FIG. 3, an unmelted filler is not generated and lack of performance of a weld metal and lack of welding efficiency do not occur. In particular, the point "⊚" is a point at which the performance of a weld metal and welding efficiency are excellent. At the point "x", an unmelted filler is generated and lack of performance of a weld metal and lack of welding efficiency occur.

As a result of decreasing the distance $D_E$ between electrodes by the above-described technique, the melting property could be improved not only by heat generation due to resistance of the trailing electrode itself, but also by effectively receiving radiant heat of the arc of the leading electrode. Although it has been described in the [2-1] that the upper limit is set for the filler energizing current $I_T$, the lower limit also needs to be set in terms of complete wire melting. Specifically, if the filler energizing current $I_T$ is less than 10 A, the stability is low regardless of the energizing distance $D_L$. Consequently, uneven heating is caused or the melting rate is not increased. In the case of no energization, obviously, the filler melting rate is significantly low, and the lower limit of the wire feeding speed described in [2-3] below is not satisfied (refer to a region where $I_T$ is 0 to 10 A in FIG. 2).

As more preferred means, a flux-cored wire is employed as the filler wire of the trailing electrode. The melting property of a filler wire has not been considered at all. In the cross section of the flux-cored wire, an energized portion is limited to only a hoop portion, which is a peripheral portion of the wire, and a flux portion located in the center is substantially insulated. Because of its small energized area, self-resistance heating is easily caused compared with solid wires and the flux-cored wire is easily melted due to quick heat conduction after the entry into the molten pool. By adjusting the composition of a wire with a flux, the melting property is not easily affected by the composition.

[2-3: Matter Concerning Formation of Sound Weld Metal]

Since a filler is melted through heat conduction from a molten pool, the molten pool formed by the arc of the leading electrode is cooled by the entry of the filler of the trailing electrode. This produces a significant effect in terms of metallurgy compared with a welding method in which a trailing electrode serves as an arc electrode. In general, it is known that, as the cooling rate of a weld metal is increased in a cooling step, the growth of crystal grains is suppressed and fine crystal grains are obtained. Consequently, high strength and high toughness can be achieved. To obtain not only high efficiency but also a weld metal having excellent mechanical properties such as high toughness compared with a single-electrode arc welding method, the filler wire feeding speed needs to be increased because such a cooling effect is insufficient at an excessively low filler wire feeding speed. In addition, if an effect of improving the efficiency is simply low, cost-effectiveness for employing two electrodes is not found. In view of the foregoing, it is essential to set the filler wire feeding speed of the trailing electrode to be 20% or more of the wire feeding speed of the leading electrode (refer to FIG. 3).

Figure 4:
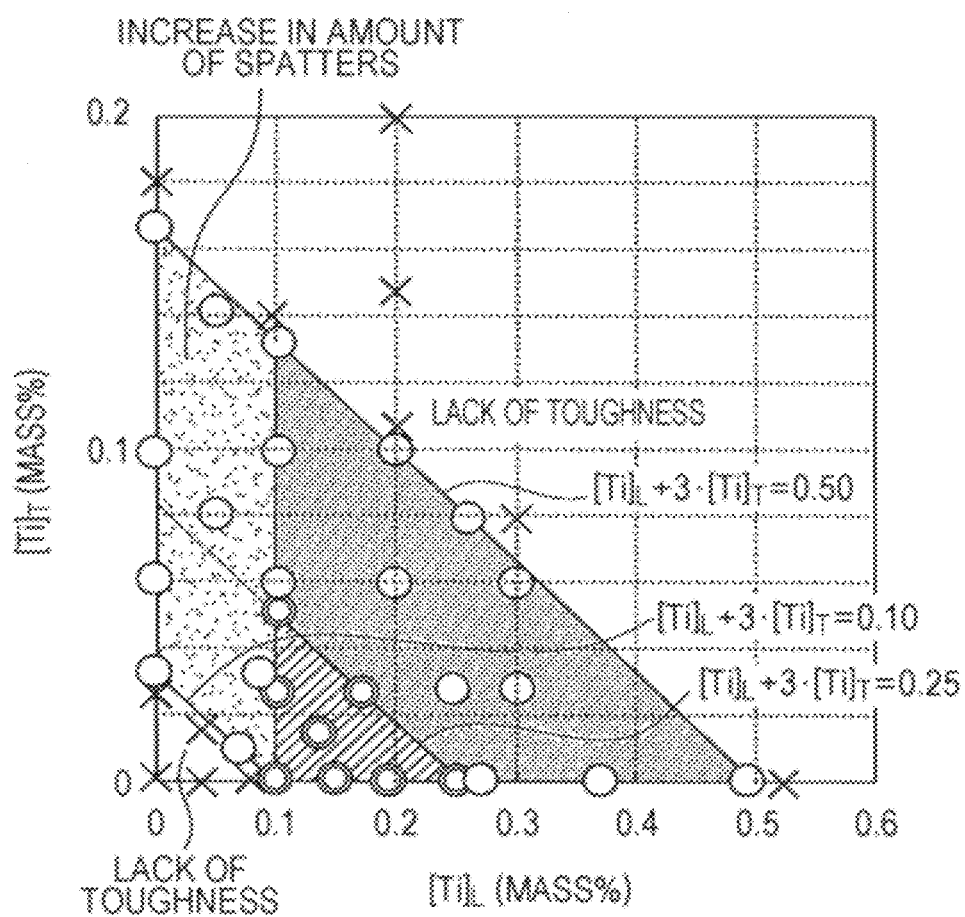
FIG. 4 is a graph showing the relationship between the Ti amount $[Ti]_L$ of a leading electrode wire and the Ti amount $[Ti]_T$ of a trailing electrode wire.
Figure 5A:
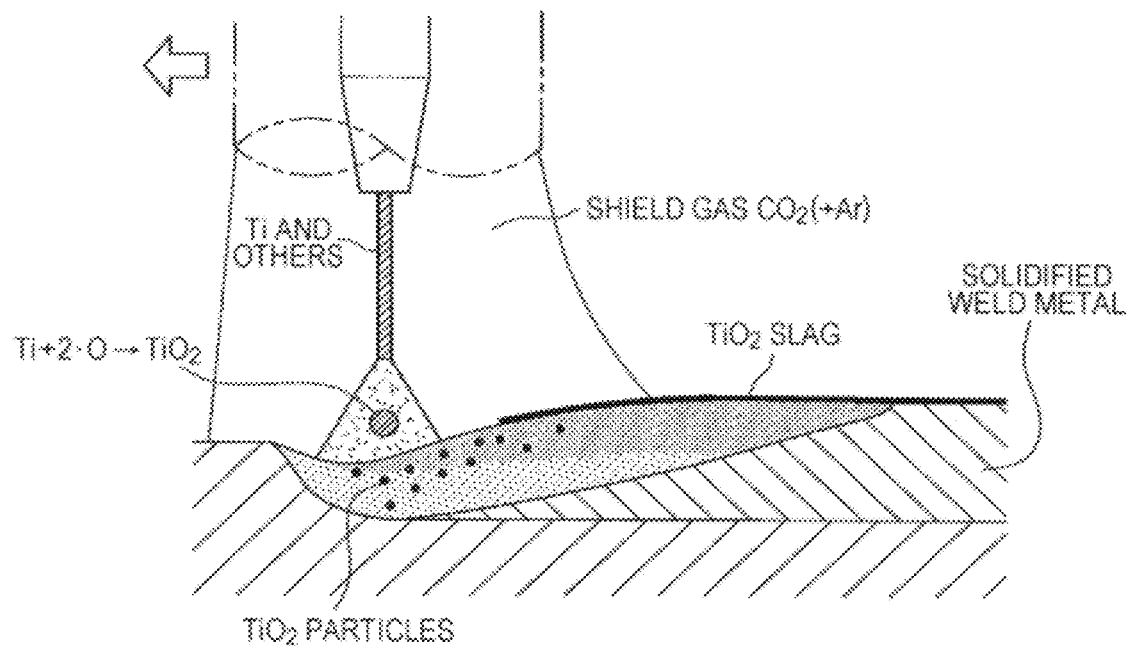
FIG. 5A is a schematic view for describing arc melting of a wire.
Figure 5B:
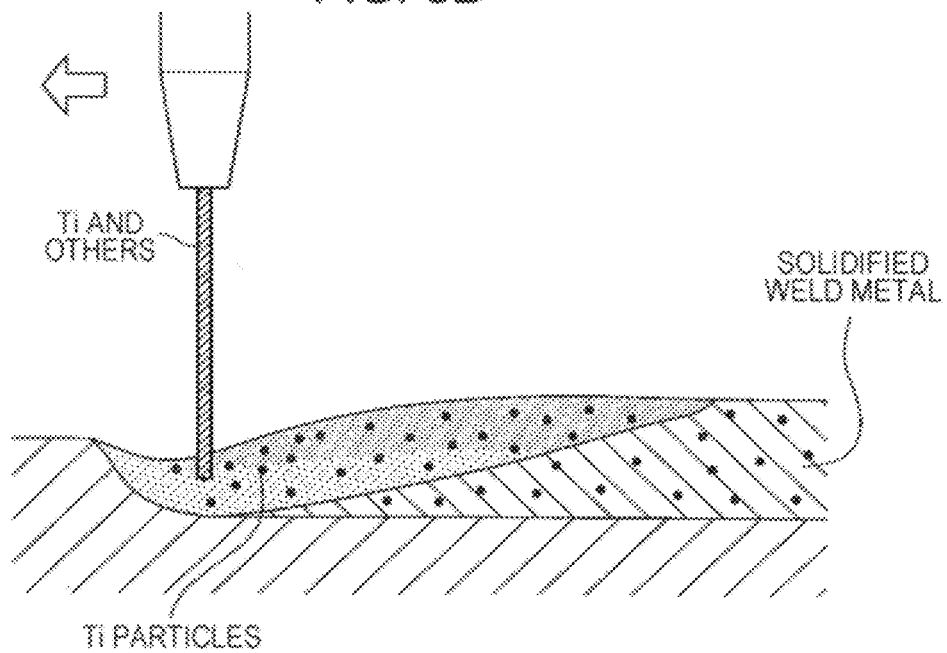
FIG. 5B is a schematic view for describing filler melting of a wire.

The soundness of a weld metal can be further improved by optimizing a welding material. It has been described in the [2-1] that the arc electrode serving as the leading electrode preferably contains 0.10 to 0.50% by mass of Ti for the purpose of decreasing the amount of spatters. However, as described in the matter concerning FIGS. 5A and 5B, Ti in the trailing electrode wire is left in the weld metal in an excessively large amount due to lack of oxidation reaction and easily decreases the toughness of the weld metal in the form of inclusions. To obtain a sound weld metal having a small number of inclusions, the total amount of Ti needs to be determined in consideration of the degree of formation of inclusions from the arc electrode and the filler electrode (refer to FIG. 4). Herein, the points "⊙" and "○" in FIG. 4 are points at which toughness is high. In particular, the point "⊙" is a point at which toughness is high and the amount of spatters is small. The point "x" is a point at which the toughness decreases and the amount of spatters increases.

Specifically, Ti in the filler electrode forms an inclusion three times as easily as Ti in the arc electrode. Therefore, when the amount of Ti in the filler electrode is represented by $[Ti]_T$ and the amount of Ti in the arc electrode is represented by $[Ti]_L$, a parameter of "$[Ti]_L+3\cdot[Ti]_T$" is defined. It was found that, when the calculation result was 0.50 or less, high toughness was achieved. When the calculation result is 0.25 or less, higher toughness is achieved. If the calculation result is less than 0.10, the total number of crystal grains is decreased and the size of crystal grains is increased due to lack of nucleation sites of crystal grains, resulting in the formation of a weld metal having low toughness. The lower limit of the calculation result is desirably 0.10. The region where $[Ti]_L$, is less than 0.10% by mass and $[Ti]_L+3\cdot[Ti]_T$ is 0.10 to 0.50 is a region where the amount of spatters is large but a weld metal has high toughness.

[2-4: Matter Concerning Depth of Penetration and Reduction in Cost]

To increase the strength and toughness of a weld metal, proper amounts of Mo and B are generally added to the weld metal from a wire. If such elements are added to a solid wire, the strength of a cast billet and a large diameter raw wire is also obviously increased. Thus, the wire drawability degrades and the productivity with which a wire is formed significantly decreases. On the other hand, if Mo and B are added to a flux in a flux-cored wire, the wire drawability is not adversely affected. However, the depth of penetration in the case of a flux-cored wire is lower than that in the case of a solid wire, and thus the flux-cored wire is not necessarily suitable as a wire of the arc electrode.

In the present invention, a flux-cored wire is employed as the filler wire of the trailing electrode and thus an amount of elements required for the molten pool formed by the leading electrode can be supplied from the flux-cored wire alone. That is, in the case where the solid wire of the leading electrode is composed of a cheap mild steel not containing Mo or B, the components Mo and B in the molten pool are adjusted using the flux-cored wire of the trailing electrode whose production cost does not increase in accordance with the composition. Thus, the cost can be reduced compared with a welding method that uses a solid wire alone. Furthermore, a solid wire is employed as the wire of the leading electrode, whereby the depth of penetration can be increased.

It has been described in the [2-1] that the distance $D_E$ between electrodes is preferably small because the tracking ability for a weld line is improved. It has also been described in the [2-2] that the distance $D_E$ between electrodes is preferably small because the melting property of the filler wire is improved. However, as the distance $D_E$ between electrodes decreases, the energy generated by an arc is decreased and thus the depth of penetration is decreased. In the case where the depth of penetration needs to be increased, the distance $D_E$ between electrodes is desirably set to be 2 mm or more. As is generally known, for the purpose of increasing the depth of penetration, it is effective to employ a reverse polarity (wire: positive, base metal: negative) in the arc electrode. As is described in the [1-4], the trailing electrode desirably has the same polarity as that of the arc electrode to increase the depth of penetration because, if the polarities are opposite to each other, the arcs repel each other and the depth of penetration is decreased.

Subsequently, the reasons for the limitations and other matters will be described.

[Guide Lead or Guide Tip Having No Energizing Function but Only Function of Determining Position of Molten Pool into which Wire is to be Inserted (Refer to [2-1])]

The trailing electrode is energized with an energizing tip disposed on the welding source side. Additionally, a function of controlling the position of a molten pool into which a filler wire is to be inserted is required. For example, a pipe having a diameter slightly larger than a wire diameter may be used, the pipe being defined as a guide lead. Alternatively, a contact tip composed of a copper alloy and normally used for an arc electrode may be used, the contact tip being defined as a guide tip. Herein, the guide lead or the guide tip needs to be electrically insulated from an energizing tip. The guide lead is disposed so as to cover a certain length of trailing electrode wire and so that a certain length of trailing electrode wire is exposed on the welding surface side of the trailing electrode. An energizing tip is disposed on the side opposite the welding surface side and is in contact with the guide lead (refer to FIG. 1A). The guide tip is disposed so as to cover a trailing electrode wire at a certain position on the welding surface side of the trailing electrode and so that a certain length of trailing electrode wire is exposed on the welding surface side (refer to FIG. 1B). The distance between the front end of the guide lead or guide tip and the welding surface is desirably 10 to 30 mm as in a typical single-electrode arc welding method. If the distance is smaller than 10 mm, spatters are easily attached or the guide lead or guide tip may be melted by heating because the distance between the arc and the guide lead or guide tip is excessively small. If the distance is larger than 30 mm, it becomes difficult to achieve a function of fixing an inserting position.

[Distance $D_L$ Between Welding Surface and Front End of Energizing Tip of Trailing Electrode on Welding Surface Side: 100 Mm or More and 1500 Mm or Less (Refer to [2-1])]

The electric current of the trailing electrode is desirably as small as possible in order to suppress the magnetic interference with the arc of the leading electrode. However, the filler wire feeding speed is desirably high in order to achieve high efficiency. For the purpose of satisfying the contradictory characteristics, the energizing distance $D_L$ is increased significantly compared with that in a conventional welding method to utilize the electrical resistance of a wire. By increasing the energizing distance $D_L$ to 100 mm or more, the amount of electric resistance heating is increased even with a small electric current and thus the filler can be sufficiently heated. The energizing distance $D_L$ is preferably 150 mm or more, more preferably 200 mm or more, and further preferably 250 mm or more because an electric current can be further reduced. However, if the energizing distance $D_L$ is excessively increased, the wire is softened due to high temperature and buckled during feeding. Consequently, the wire cannot be fed. Therefore, the upper limit of the energizing distance $D_L$ is set to be 1500 mm and is preferably 1000 mm or less and more preferably 800 mm or less.

The proper distance between the welding surface and the front end of the energizing tip of the leading electrode is 10 to 30 mm as in a conventional method. In a normal operation, if the distance between the welding surface and the front end of the energizing tip of the leading electrode is increased in arc welding, the current value decreases and a function of ensuring penetration by an arc force degrades. In addition, the arc itself cannot be maintained. A function of fixing an inserting position also degrades. Therefore, the practical upper limit is 30 mm. A distance of less than 10 mm poses problems in that spatters are easily attached, the front end of the tip is melted due to radiant heat of the arc, and it becomes difficult to insert the trailing electrode.

[Distance $D_E$ Between Leading Electrode and Trailing Electrode on welding surface: 10 mm or less (refer to [2-1], [2-2], and [2-4])]

The distance between electrodes is important in a multi-electrode welding method. It is advantageous to decrease the distance between electrodes in terms of tracking ability for a curved weld line and reduction in the length of a portion having lack of deposition at the beginning and end of welding. In the case where the trailing electrode is a filler electrode as in the present invention, as the trailing electrode comes close to the arc of the leading electrode, the trailing electrode is heated and the melting rate of the trailing electrode is increased. However, as the trailing electrode comes close to the arc, stronger magnetic interference is generated between the electrodes and the amount of spatters from the arc electrode is increased. In the present invention, since the filler energizing current $I_T$ is suppressed to a value that is lower than a conventional value, the distance between electrodes can be further decreased compared with the distance in the past, which is 15 to 40 mm. Specifically, the distance between electrodes is 10 mm or less, preferably 7 mm or less, and more preferably 5 mm or less. If the distance is excessively decreased, the depth of penetration is decreased. When a sufficiently deep penetration is required, the lower limit is desirably set to be 2 mm.

[Electric Current of Leading Electrode: 250 A or More (Refer to [2-1])]

There is a lower limit of an electric current of the leading electrode to achieve good spattering property and an arc force that provides a sufficient thickness of the molten pool for melting the filler of the trailing electrode. The electric current of the leading electrode needs to be 250 A or more and is preferably 300 A or more and more preferably 350 A or more. There is no particular reason for limiting the upper limit. In general, the upper limit of an electric current is physically determined by the upper limit of the number of revolutions of a motor for feeding a wire or the guaranteed value of the upper limit of an electric current of a welding machine.

[Electric Current of Trailing Electrode: 10 A or More and 50% or Less of Electric Current of Leading Electrode (Refer to [2-1] and [2-2])]

As the electric current of the trailing electrode increases, an influence of magnetic interference is strongly exerted on the arc of the leading electrode and a large amount of spatters is generated. The upper limit of the filler energizing current $I_T$ that does not cause significant magnetic interference was investigated and it was found that the filler energizing current $I_T$ needed to be suppressed to 50% or less of an electric current of the leading electrode and was preferably 30% or less. If the filler energizing current $I_T$ is less than 10 A, the stability is low regardless of the energizing distance $D_L$. Consequently, uneven heating is caused or the melting rate is not increased and complete melting cannot be ensured. Therefore, the lower limit of the filler energizing current $I_T$ is 10 A. The filler energizing current $I_T$ is preferably 25 A or more.

[Feeding Speed of Trailing Electrode Wire: 20% or More and 50% or Less of Feeding Speed of Leading Electrode Wire (Refer to [2-2] and [2-3])]

There is an upper limit of the feeding speed of the filler wire in order to completely melt the filler wire. If the feeding speed of the trailing electrode wire is more than 50% of the feeding speed of the leading electrode wire, an unmelted filler is generated with any combination between the filler energizing current $I_T$ and the energizing distance $D_L$. Therefore, the upper limit of the feeding speed of the trailing electrode wire is 50% of the feeding speed of the leading electrode wire, and the feeding speed is preferably 40% or less. If the feeding speed of the trailing electrode wire is excessively low, an improvement of the toughness of a weld metal by the cooling effect of a molten pool cannot be expected. To decrease the size of crystal grains, the feeding speed of the trailing electrode wire needs to be 20% or more of the feeding speed of the leading electrode wire and is preferably 30% or more. When the leading electrode and the trailing electrode have different wire diameters, a deposition rate (g/min) may be specified by converting the "feeding speed: 20 to 50% of feeding speed of leading electrode".

[Current Polarities of Both Leading Electrode Wire and Trailing Electrode Wire are "Positive" or "Negative" with Respect to Base Metal (Refer to [2-1])]

When an electric current passes through two adjacent electrodes in the same direction, the arcs of the electrodes attract each other due to the effect of directions of magnetic lines of force. When an electric current passes through two adjacent electrodes in opposite directions, the arcs repel each other. Therefore, when the leading electrode and the trailing electrode attract each other, spatters from the arc electrode serving as the leading electrode are highly likely to enter the molten pool, resulting in a relatively small amount of scattered spatters. In contrast, when the leading electrode and the trailing electrode repel each other, all spatters from the arc electrode serving as the leading electrode fly out forward along the weld line to become scattered spatters and thus adverse effects are significantly produced. Therefore, an electric current preferably passes through two electrodes in the same direction. Preferably, both of the two electrodes have a positive polarity or a negative polarity and the base metal has the opposite polarity. The current polarity also affects penetration. If the current polarities are in opposite directions, the depth of penetration is decreased. If the current polarities are in the same direction, the depth of penetration is increased, which is effective for preventing incomplete penetration. Although an alternating polarity is not often used in a high-current gas shielded arc welding method, an alternating polarity can be applied to the arc electrode serving as the leading electrode or the filler electrode serving as the trailing electrode because no particular problem is caused. Note that there is virtually no directionality of electric current in an alternating current and thus magnetic interference is also not generated. When one of the electrodes has an alternating current and the other has a direct current, there is no need to worry the polarity of the other electrode.

[Leading Electrode Wire is Solid Wire or Flux-Cored Wire (Refer to [2-4])]

Examples of wires used for a typical gas-shielded arc welding method include a solid wire and a flux-cored wire obtained by covering a flux located in the center with a metal tube. The flux is usually composed of powder of a compound, such as iron powder, nonferrous metal powder, or oxide powder. Either of the solid wire or the flux-cored wire can be employed as a wire for the arc electrode of this welding method. The solid wire provides deep penetration but a slightly large amount of spatters. The flux-cored wire often has the opposite characteristics. In the present invention, they can be selected in accordance with the purpose in consideration of such characteristics. The solid wire and the flux-cored wire often have a surface subjected to copper plating, but the presence or absence of copper plating does not affect the main advantages of the present invention. The flux-cored wire has seams on the surface of a tubular portion or has no seams thereon, but the presence or absence of seams does not affect the main advantages of the present invention. The flux ratio (ratio of mass of flux to total mass per unit length of a wire) is also not necessarily limited.

[Trailing Electrode Wire is Flux-Cored Wire and Flux Ratio is 10% or More by Mass (Refer to [1-5], [2-2], and [2-4])]

The filler electrode wire is preferably a flux-cored wire. Since a flux-cored wire has a small cross sectional area of energization, self-resistance heating is easily caused compared with a solid wire and the flux-cored wire is easily melted due to quick heat conduction after the entry into a molten pool. Therefore, the flux-cored wire is suitable as a wire of the filler electrode. If the composition of a wire is adjusted using a flux, the melting property is not significantly affected by the composition, which achieves a high degree of freedom of composition design. The cost may be decreased in the case where a nonferrous metal element is added in the form of a flux-cored wire compared with the case where a nonferrous metal element is added in the form of a solid wire. When the leading electrode wire is a solid wire and the trailing electrode wire is a flux-cored wire, both of deep penetration and formation of a molten pool containing an alloy element at low cost can be achieved. The flux ratio of the flux-cored wire is desirably 10% or more by mass. If the flux ratio is less than 10% by mass, the cross sectional area of energization increases and self-resistance heating becomes insufficient. Consequently, the flux-cored wire is not easily melted after the entry into a molten pool. However, the flux ratio is not limited to 10% or more by mass. Although the upper limit of the flux ratio is not necessarily specified, the upper limit of the flux ratio of the flux-cored wire is generally about 28% in terms of production stability.

[[Ti]$_L$+3·[Ti]$_T$: 0.10 or More and 0.50 or Less (Refer to [1-5] and [2-3])]

Since the filler electrode does not generate an arc, an oxidation reaction caused by contact between droplets (wire-melted liquid) and atmosphere gas generated in a high-temperature arc space substantially does not occur. Thus, it was found that, when a wire having a composition that is optimized for an arc electrode by containing a reducing element with a strong oxygen affinity, such as Ti, was employed as a wire of the filler electrode, the process "a reducing element is oxidized and then discharged in the form of slag" was not undergone and thus an excessive number of inclusions were left in the weld metal and the toughness significantly degraded. Specifically, Ti in the filler electrode forms an inclusion three times as easily as Ti in the arc electrode, and therefore a parameter of [Ti]$_L$+3·[Ti]$_T$ is defined. When the calculation result is 0.50 or less, high toughness is achieved. When the calculation result is 0.25 or less, higher toughness is achieved. If the calculation result is less than 0.10, the total number of crystal grains is decreased and the size of crystal grains is increased due to lack of nucleation sites of crystal grains, resulting in the formation of a weld metal having low toughness. The lower limit of the calculation result is desirably 0.10. However, the calculation result is not limited to 0.10 or more and 0.50 or less. In the case of a flux-cored wire, even if Ti is contained in the form of a compound such as Fe·Ti, TiO$_2$, or FeTiO$_3$, [Ti] is defined as a concentration equivalent to the total Ti concentration in the compound.

[[Ti]$_L$: 0.10% or More and 0.50% or Less by Mass (Refer to [2-1])]

For the purpose of decreasing the amount of spatters, the size of droplets of the arc of the leading electrode is suitably increased so that the droplets are not blown away by magnetic interference from the trailing electrode. To achieve this, the wire used for the arc electrode desirably contains 0.10% or more by mass of Ti. The upper limit of Ti is inevitably 0.50% by mass if priority is placed on the condition "[Ti]$_L$+3·[Ti]$_T$: 0.10 or more and 0.50 or less". If [Ti]$_L$ is more than 0.50% by mass, the size of droplets is excessively increased and the movement of droplets becomes unstable. Consequently, such large droplets are scattered and attached to a base metal and it becomes more difficult to remove the droplets. Thus, the upper limit is 0.50% by mass. However, [Ti]$_L$ is not limited to 0.10% or more and 0.50% or less by mass. [Ti]$_L$ is desirably 0.25% or less by mass.

[Trailing Electrode Wire Contains at Least One of B: 0.0020% or More and 0.0500% or Less by Mass and Mo: 0.10% or More and 1.00% or Less by Mass Relative to Total Mass of Wire (Refer to [2-4])]

To increase the strength and toughness of a weld metal, proper amounts of Mo and B are generally added to the weld metal from a wire. If such elements are added to a solid wire, the strength of a cast billet and a large diameter raw wire is also obviously increased. Thus, the wire drawability degrades and the productivity with which a wire is formed significantly decreases. On the other hand, if Mo and B are added to a flux in a flux-cored wire, the wire drawability is not adversely affected. In the present invention, preferably, by employing a flux-cored wire as the filler wire of the trailing electrode, an amount of elements required for the molten pool formed by the leading electrode is supplied from the flux-cored wire alone. That is, the solid wire of the leading electrode is composed of a cheap mild steel not containing Mo or B, and the components in the molten pool are adjusted using the flux-cored wire of the trailing electrode whose production cost does not increase in accordance with the composition. To achieve an excellent weld metal composition by adding B and Mo mainly from the trailing electrode, at least one of B: 0.0020% or more and 0.0500% or less by mass and Mo: 0.10% or more and 1.00% or less by mass may be added in accordance with the wire feeding speed ratio. When B and Mo are added, the contents thereof are not limited to B: 0.0020% or more and 0.0500% or less by mass and Mo: 0.10% or more and 1.00% or less by mass.

[Others]

The type of welding source is not necessarily specified. The arc electrode serving as the leading electrode most suitably has a constant-voltage characteristic that makes the wire feeding speed and arc length constant. The filler electrode serving as the trailing electrode most suitably has a constant-current characteristic that can fix an energizing current value or a drooping characteristic. Regarding a waveform, a pulse can be used for both the electrodes.

The same shield gas as that used in typical single-electrode gas-shielded arc welding can be used. For example, only $CO_2$ or mixed gas obtained by mixing Ar with 3% or more by volume of $CO_2$ or $O_2$ can be employed. If the mixing ratio of Ar is further increased, porosity defects easily occur and the arc becomes unstable, which are the same as in a conventional welding method. When deep penetration is required, the ratio of $CO_2$ is increased. The gas flow rate may be the same as in single-electrode gas-shielded arc welding that uses only an arc electrode. This is because, since an arc is not generated in the trailing electrode, there is no need to worry the entry of air into an arc atmosphere. The welding method of the present invention has advantages over a conventional two-electrode gas-shielded tandem arc welding method in which a shield gas needs to be provided from two channels (refer to [1-1]) in terms of reduction in gas cost. The gas flow rate of the single-electrode gas-shielded arc welding method is about 25 L/min as a standard.

The detailed composition of a welding wire is not necessarily limited. The welding wire may contain, as a base, "0.01 to 0.15% by mass of C, 0.10 to 1.00% by mass of Si, 0.50 to 2.50% by mass of Mn, no addition of S or active addition of S (0.050% or less by mass), and the balance Fe", which are proper amounts in a typical welding wire for carbon steel, and furthermore may contain elements such as Ti, Al, Mo, B, Cr, and Ni in accordance with functions required for a weld metal as in the case of wires for typical gas-shielded arc welding. When elements that impair the wire drawability and arc stability are added, a flux-cored wire is employed as the trailing electrode wire and such elements are desirably added thereto.

The wire diameter of the arc electrode serving as the leading electrode is suitably 1.2 to 2.0 mmφ in terms of deposition efficiency, formation of a molten pool that can sufficiently melt the filler of the trailing electrode, generation of thermal energy that can sufficiently melt the filler, stability of an arc, and good spattering property. Since it becomes difficult to melt a filler wire due to a decrease in heat conductivity as the diameter of the filler wire increases, the diameter of the filler wire is slightly smaller than that of the wire of the arc electrode. Specifically, the diameter is desirably 1.0 to 1.6 mmφ. However, the diameter of the trailing electrode wire is not necessarily smaller than that of the leading electrode wire.

EXAMPLES

The present invention will now be specifically described by comparing Examples that satisfy the requirement of the present invention with Comparative Examples that do not satisfy the requirement of the present invention.

With a welding apparatus based on the welding apparatus shown in FIG. 1A, (1) one-pass welding on a flat sheet having a thickness of 12 mm (so-called one-run welding in a two-electrode welding method) and (2) multilayer welding conforming to JIS Z3312: 1999 with a groove (sheet thickness: 20 mm, V45°, root gap: 12 mm) were performed under the same welding conditions. The electric current, voltage, and speed were selected so that the total heat input of both electrodes was 40 kJ/cm.

Tables 1 to 4 show the parameters of the welding conditions and the composition of the welding wire. In Tables 1 to 4, "-" indicates the absence of a component, a value, or the like. When a value or the like does not satisfy a predetermined condition, such a value is underlined. In a shield gas composition, the total amount of shield gas was 100% by volume (for example, "$CO_2$" means "100% by volume of $CO_2$" and "Ar+20% $CO_2$" means "80% by volume of Ar+20% by volume of $CO_2$"). The diameters of the leading electrode wire and trailing electrode wire were 1.2 mmφ. The welding source of the leading electrode was a direct-current welding machine having a constant-voltage characteristic, and the welding source of the trailing electrode was a direct-current or alternating-current welding machine having a constant-current characteristic. In Tables, "EP" means that a direct current was employed and the electrodes were positive (+) and the base metal was negative (−). "EN" means that a direct current was employed and the electrodes were negative (−) and the base metal was positive (+). "AC" means that an alternating current was employed. In the case where a guide lead was used, the distance between the welding surface and the front end of the guide lead on the welding surface side was 25 mm.

TABLE 1

| | | | | | Leading electrode | | | | | | | |
| | | | | | Composition (mass %) (Balance: Fe and incidental impurities) | | | | | | | |
| No. | Category | Melting form | Polarity | Wire type | C | Si | Mn | P | S | Ti (=$[Ti]_L$) | Mo | B |
|---|---|---|---|---|---|---|---|---|---|---|---|---|
| 1 | Ex. 1 | arc | EP | Solid | 0.05 | 0.75 | 1.60 | 0.010 | 0.010 | 0.00 | — | — |
| 2 | Ex. 2 | arc | EP | FCW | 0.05 | 0.75 | 1.60 | 0.010 | 0.010 | 0.05 | — | 0.0041 |
| 3 | Ex. 3 | arc | EP | Solid | 0.05 | 0.75 | 1.60 | 0.010 | 0.010 | 0.00 | — | — |
| 4 | Ex. 4 | arc | EP | Solid | 0.05 | 0.75 | 1.15 | 0.010 | 0.010 | 0.07 | — | — |
| 5 | Ex. 5 | arc | EP | Solid | 0.05 | 0.75 | 1.60 | 0.010 | 0.010 | 0.00 | — | — |
| 6 | Ex. 6 | arc | EP | Solid | 0.05 | 0.75 | 1.60 | 0.010 | 0.010 | 0.00 | — | — |
| 7 | Ex. 7 | arc | EP | FCW | 0.05 | 0.80 | 2.00 | 0.010 | 0.007 | 0.01 | — | — |
| 8 | Ex. 8 | arc | EP | Solid | 0.05 | 0.75 | 1.60 | 0.010 | 0.010 | 0.20 | — | — |
| 9 | Ex. 9 | arc | EP | Solid | 0.05 | 0.75 | 1.60 | 0.010 | 0.010 | 0.20 | — | — |
| 10 | Ex. 10 | arc | EP | Solid | 0.05 | 0.75 | 1.60 | 0.010 | 0.010 | 0.20 | — | — |
| 11 | Ex. 11 | arc | EP | Solid | 0.05 | 0.75 | 1.60 | 0.010 | 0.010 | 0.20 | — | — |
| 12 | Ex. 12 | arc | EP | Solid | 0.05 | 0.75 | 1.60 | 0.010 | 0.010 | 0.05 | — | — |
| 13 | Ex. 13 | arc | EP | Solid | 0.05 | 0.75 | 1.60 | 0.010 | 0.010 | 0.20 | — | — |
| 14 | Ex. 14 | arc | EP | Solid | 0.05 | 0.75 | 1.60 | 0.010 | 0.010 | 0.20 | — | — |
| 15 | Ex. 15 | arc | EP | Solid | 0.05 | 0.85 | 1.75 | 0.010 | 0.006 | 0.18 | 0.20 | 0.0035 |

TABLE 1-continued

| No. | Category | | | | C | Si | Mn | P | S | Ti | Mo | B |
|---|---|---|---|---|---|---|---|---|---|---|---|---|
| 16 | Ex. 16 | arc | EP | Solid | 0.05 | 0.75 | 1.60 | 0.010 | 0.010 | 0.20 | — | — |
| 17 | Ex. 17 | arc | EP | Solid | 0.05 | 0.75 | 1.60 | 0.010 | 0.010 | 0.20 | — | — |
| 18 | Ex. 18 | arc | EP | Solid | 0.05 | 0.75 | 1.60 | 0.010 | 0.010 | 0.00 | — | — |
| 19 | Ex. 19 | arc | EP | Solid | 0.05 | 0.75 | 1.60 | 0.010 | 0.010 | 0.00 | — | — |
| 20 | Ex. 20 | arc | EP | Solid | 0.05 | 0.75 | 1.60 | 0.010 | 0.010 | 0.00 | — | — |
| 21 | Ex. 21 | arc | EP | Solid | 0.05 | 0.75 | 1.60 | 0.010 | 0.010 | 0.00 | — | — |
| 22 | Ex. 22 | arc | EP | Solid | 0.05 | 0.75 | 1.60 | 0.010 | 0.010 | 0.20 | — | — |
| 23 | Ex. 23 | arc | EP | Solid | 0.05 | 0.75 | 1.60 | 0.010 | 0.010 | 0.20 | — | — |
| 24 | Ex. 24 | arc | EP | Solid | 0.05 | 0.75 | 1.60 | 0.010 | 0.010 | 0.00 | — | — |
| 25 | Ex. 25 | arc | EP | Solid | 0.05 | 0.75 | 1.60 | 0.010 | 0.010 | 0.00 | — | — |
| 26 | Ex. 26 | arc | EP | Solid | 0.05 | 0.75 | 1.60 | 0.010 | 0.010 | 0.55 | — | — |
| 27 | Ex. 27 | arc | EP | Solid | 0.05 | 0.75 | 1.60 | 0.010 | 0.010 | 0.20 | — | — |
| 28 | Ex. 28 | arc | EP | Solid | 0.05 | 0.75 | 1.60 | 0.010 | 0.010 | 0.20 | — | — |
| 29 | Ex. 29 | arc | EP | Solid | 0.05 | 0.85 | 1.75 | 0.010 | 0.006 | 0.18 | 0.20 | 0.0035 |
| 30 | Ex. 30 | arc | EP | Solid | 0.03 | 0.50 | 1.30 | 0.010 | 0.015 | 0.10 | — | — |
| 31 | Ex. 31 | arc | EP | Solid | 0.05 | 0.75 | 1.60 | 0.010 | 0.010 | 0.20 | — | — |
| 32 | Ex. 32 | arc | EP | Solid | 0.05 | 0.50 | 2.00 | 0.010 | 0.010 | 0.20 | 0.40 | 0.0040 |

| | | Leading electrode | | | |
|---|---|---|---|---|---|
| No. | Category | Current L (A) | Feeding speed (m/min) | Voltage (V) | Shield gas composition (% means % by volume) | Distance $D_E$ between electrodes (mm) |
|---|---|---|---|---|---|---|
| 1 | Ex. 1 | 350 | 17.5 | 37 | $CO_2$ | 5 |
| 2 | Ex. 2 | 350 | 17.5 | 35 | Ar + 20% $CO_2$ | 5 |
| 3 | Ex. 3 | 350 | 17.5 | 37 | $CO_2$ | 5 |
| 4 | Ex. 4 | 350 | 17.5 | 35 | Ar + 20% $CO_2$ | 5 |
| 5 | Ex. 5 | 350 | 17.5 | 37 | $CO_2$ | 5 |
| 6 | Ex. 6 | 350 | 17.5 | 37 | $CO_2$ | 5 |
| 7 | Ex. 7 | 350 | 17.5 | 37 | $CO_2$ | 5 |
| 8 | Ex. 8 | 350 | 17.5 | 37 | $CO_2$ | 5 |
| 9 | Ex. 9 | 350 | 17.5 | 37 | $CO_2$ | 5 |
| 10 | Ex. 10 | 350 | 17.5 | 37 | $CO_2$ | 5 |
| 11 | Ex. 11 | 350 | 17.5 | 37 | $CO_2$ | 5 |
| 12 | Ex. 12 | 350 | 17.5 | 37 | $CO_2$ | 5 |
| 13 | Ex. 13 | 350 | 17.5 | 37 | $CO_2$ | 5 |
| 14 | Ex. 14 | 350 | 17.5 | 37 | $CO_2$ | 5 |
| 15 | Ex. 15 | 350 | 17.5 | 37 | $CO_2$ | 5 |
| 16 | Ex. 16 | 350 | 17.5 | 37 | $CO_2$ | 5 |
| 17 | Ex. 17 | 350 | 17.5 | 37 | $CO_2$ | 5 |
| 18 | Ex. 18 | 350 | 17.5 | 37 | $CO_2$ | 5 |
| 19 | Ex. 19 | 350 | 17.5 | 37 | $CO_2$ | 5 |
| 20 | Ex. 20 | 350 | 17.5 | 37 | $CO_2$ | 5 |
| 21 | Ex. 21 | 350 | 17.5 | 37 | $CO_2$ | 5 |
| 22 | Ex. 22 | 350 | 17.5 | 37 | $CO_2$ | 5 |
| 23 | Ex. 23 | 350 | 17.5 | 37 | $CO_2$ | 5 |
| 24 | Ex. 24 | 350 | 17.5 | 37 | $CO_2$ | 5 |
| 25 | Ex. 25 | 350 | 17.5 | 37 | $CO_2$ | 5 |
| 26 | Ex. 26 | 350 | 17.5 | 37 | $CO_2$ | 5 |
| 27 | Ex. 27 | 350 | 17.5 | 37 | $CO_2$ | 5 |
| 28 | Ex. 28 | 350 | 17.5 | 37 | $CO_2$ | 5 |
| 29 | Ex. 29 | 410 | 24.0 | 43 | $CO_2$ | 7 |
| 30 | Ex. 30 | 300 | 14.0 | 32 | Ar + 20% $CO_2$ | 3 |
| 31 | Ex. 31 | 250 | 11.0 | 32 | $CO_2$ | 5 |
| 32 | Ex. 32 | 300 | 13.0 | 33 | $CO_2$ | 10 |

Ex.: Example

TABLE 2

| | | | | | Leading electrode | | | | | | | |
|---|---|---|---|---|---|---|---|---|---|---|---|---|
| | | | | | Composition (mass %) (Balance: Fe and incidental impurities) | | | | | | | |
| No. | Category | Melting form | Polarity | Wire type | C | Si | Mn | P | S | Ti $(=[Ti]_L)$ | Mo | B |
| 33 | Ex. 33 | arc | EP | Solid | 0.05 | 0.90 | 2.00 | 0.010 | 0.010 | 0.20 | 0.40 | — |
| 34 | Ex. 34 | arc | EP | Solid | 0.05 | 0.75 | 1.60 | 0.010 | 0.010 | 0.14 | 0.20 | 0.0035 |
| 35 | Ex. 35 | arc | EP | Solid | 0.08 | 0.75 | 1.60 | 0.010 | 0.010 | 0.10 | — | — |
| 36 | Ex. 36 | arc | EP | Solid | 0.05 | 0.75 | 1.45 | 0.010 | 0.010 | 0.20 | — | 0.0025 |
| 37 | Ex. 37 | arc | EN | FCW | 0.05 | 0.75 | 1.60 | 0.010 | 0.015 | 0.25 | *(Al: 0.50) | |
| 38 | Ex. 38 | arc | EP | FCW | 0.05 | 0.75 | 1.60 | 0.010 | 0.010 | 0.10 | — | — |

TABLE 2-continued

| No. | Label | | | | | | | | | | | |
|---|---|---|---|---|---|---|---|---|---|---|---|---|
| 39 | Ex. 39 | arc | EP | Solid | 0.05 | 0.50 | 1.95 | 0.010 | 0.003 | 0.10 | — | — |
| 40 | Ex. 40 | arc | EP | Solid | 0.05 | 0.75 | 1.85 | 0.010 | 0.007 | 0.30 | 0.10 | 0.0010 |
| 41 | C.E. 1 | arc | EP | Solid | 0.05 | 0.75 | 1.60 | 0.010 | 0.010 | 0.20 | — | — |
| 42 | C.E. 2 | arc | EP | Solid | 0.05 | 0.75 | 1.60 | 0.010 | 0.010 | 0.20 | — | — |
| 43 | C.E. 3 | arc | EP | Solid | 0.05 | 0.75 | 1.60 | 0.010 | 0.010 | 0.20 | — | — |
| 44 | C.E. 4 | arc | EP | Solid | 0.05 | 0.75 | 1.60 | 0.010 | 0.010 | 0.20 | — | — |
| 45 | C.E. 5 | arc | EP | Solid | 0.05 | 0.75 | 1.60 | 0.010 | 0.010 | 0.20 | — | — |
| 46 | C.E. 6 | arc | EP | Solid | 0.05 | 0.75 | 1.60 | 0.010 | 0.010 | 0.20 | — | — |
| 47 | C.E. 7 | arc | EP | Solid | 0.05 | 0.75 | 1.60 | 0.010 | 0.010 | 0.20 | — | — |
| 48 | C.E. 8 | arc | EP | Solid | 0.05 | 0.75 | 1.60 | 0.010 | 0.010 | 0.20 | — | — |
| 49 | C.E. 9 | arc | EP | Solid | 0.05 | 0.75 | 1.60 | 0.010 | 0.010 | 0.20 | — | — |
| 50 | C.E. 10 | arc | EP | Solid | 0.05 | 0.75 | 1.60 | 0.010 | 0.010 | 0.20 | — | — |
| 51 | C.E. 11 | arc | EP | Solid | 0.05 | 0.75 | 1.60 | 0.010 | 0.010 | 0.20 | — | — |
| 52 | C.E. 12 | arc | EP | Solid | 0.05 | 0.75 | 1.60 | 0.010 | 0.010 | 0.20 | — | — |
| 53 | C.E. 13 | arc | EP | Solid | 0.05 | 0.75 | 1.60 | 0.010 | 0.010 | 0.20 | — | — |
| 54 | C.E. 14 | arc | EP | Solid | 0.05 | 0.75 | 1.60 | 0.010 | 0.010 | 0.20 | — | — |
| 55 | C.E. 15 | arc | EP | Solid | 0.05 | 0.75 | 1.60 | 0.010 | 0.010 | 0.20 | — | — |
| 56 | C.E. 16 | arc | EP | Solid | 0.05 | 0.75 | 1.60 | 0.010 | 0.010 | 0.20 | — | — |
| 57 | C.E. 17 | arc | EP | Solid | 0.05 | 0.75 | 1.60 | 0.010 | 0.010 | 0.20 | — | — |
| 58 | C.E. 18 | arc | EP | Solid | 0.05 | 0.75 | 1.60 | 0.010 | 0.010 | 0.20 | — | — |
| 59 | C.E. 19 | arc | EP | Solid | 0.05 | 0.75 | 1.60 | 0.010 | 0.010 | 0.20 | — | — |
| 60 | C.E. 20 | arc | EP | Solid | 0.05 | 0.75 | 1.60 | 0.010 | 0.010 | 0.20 | — | — |
| 61 | C.E. 21 | arc | EP | Solid | 0.05 | 0.75 | 1.60 | 0.010 | 0.010 | 0.20 | — | — |
| 62 | C.E. 22 | arc | EP | Solid | 0.05 | 0.75 | 1.60 | 0.010 | 0.010 | 0.20 | — | — |
| 63 | C.E. 23 | arc | EP | Solid | 0.05 | 0.75 | 1.60 | 0.010 | 0.010 | 0.05 | — | — |
| 64 | C.E. 24 | arc | EP | Solid | 0.05 | 0.75 | 1.60 | 0.010 | 0.010 | 0.14 | 0.20 | 0.0035 |
| 65 | C.E. 25 | arc | EP | FCW | 0.05 | 0.75 | 2.20 | 0.010 | 0.005 | 1.00 | — | — |

| | | Leading electrode | | | | |
|---|---|---|---|---|---|---|
| No. | Category | Current L (A) | Feeding speed (m/min) | Voltage (V) | Shield gas composition (% means % by volume) | Distance $D_E$ between electrodes (mm) |
| 33 | Ex. 33 | 375 | 20.0 | 40 | $CO_2$ | 2 |
| 34 | Ex. 34 | 350 | 17.5 | 37 | $CO_2$ | 6 |
| 35 | Ex. 35 | 320 | 15.0 | 35 | $CO_2$ | 4 |
| 36 | Ex. 36 | 300 | 14.0 | 33 | $CO_2$ | 5 |
| 37 | Ex. 37 | 320 | 17.5 | 32 | $CO_2$ | 8 |
| 38 | Ex. 38 | 280 | 14.5 | 31 | $CO_2$ | 5 |
| 39 | Ex. 39 | 350 | 17.5 | 32 | $A + 3\% O_2$ | 5 |
| 40 | Ex. 40 | 390 | 22.0 | 41 | $CO_2$ | 5 |
| 41 | C.E. 1 | <u>240</u> | <u>7.1</u> | <u>28</u> | $CO_2$ | 5 |
| 42 | C.E. 2 | 350 | 17.5 | 37 | $CO_2$ | 5 |
| 43 | C.E. 3 | 350 | 17.5 | 37 | $CO_2$ | 5 |
| 44 | C.E. 4 | 350 | 17.5 | 37 | $CO_2$ | 5 |
| 45 | C.E. 5 | 350 | 17.5 | 37 | $CO_2$ | <u>12</u> |
| 46 | C.E. 6 | 350 | 17.5 | 37 | $CO_2$ | <u>12</u> |
| 47 | C.E. 7 | 350 | 17.5 | 37 | $CO_2$ | <u>12</u> |
| 48 | C.E. 8 | 350 | 17.5 | 37 | $CO_2$ | <u>12</u> |
| 49 | C.E. 9 | 350 | 17.5 | 37 | $CO_2$ | 5 |
| 50 | C.E. 10 | 350 | 17.5 | 37 | $CO_2$ | 5 |
| 51 | C.E. 11 | 350 | 17.5 | 37 | $CO_2$ | 5 |
| 52 | C.E. 12 | 350 | 17.5 | 37 | $CO_2$ | 5 |
| 53 | C.E. 13 | 350 | 17.5 | 37 | $CO_2$ | — |
| 54 | C.E. 14 | 350 | 17.5 | 37 | $CO_2$ | 5 |
| 55 | C.E. 15 | 350 | 17.5 | 37 | $CO_2$ | 5 |
| 56 | C.E. 16 | 350 | 17.5 | 37 | $CO_2$ | 5 |
| 57 | C.E. 17 | 350 | 17.5 | 37 | $CO_2$ | 5 |
| 58 | C.E. 18 | 350 | 17.5 | 37 | $CO_2$ | <u>12</u> |
| 59 | C.E. 19 | 350 | 17.5 | 37 | $CO_2$ | 5 |
| 60 | C.E. 20 | 350 | 17.5 | 37 | $CO_2$ | 5 |
| 61 | C.E. 21 | 350 | 17.5 | 37 | $CO_2$ | 5 |
| 62 | C.E. 22 | 350 | 17.5 | 35 | $Ar + 20\% CO_2$ | <u>15</u> |
| 63 | C.E. 23 | 350 | 17.5 | 35 | $Ar + 20\% CO_2$ | 5 |
| 64 | C.E. 24 | 350 | 17.5 | 37 | $CO_2$ | 6 |
| 65 | C.E. 25 | 420 | 25.0 | 42 | $CO_2$ | <u>20</u> |

Ex.: Example,
C.E.: Comparative Example
* In Example 37, Mo and B were not contained and 0.50% by mass of Al was contained.

TABLE 3

| | | | | | | | | Trailing electrode | | | | | | | | |
| | | | | | | | | | | | Composition | | | | | |
| No. | Category | Melting form | Polarity | Energizing distance $D_L$ (mm) | Guide lead | Wire type | Flux ratio (%) | C | Si | Mn | P | S | Ti (=$[Ti]_T$) | B | Mo |
|---|---|---|---|---|---|---|---|---|---|---|---|---|---|---|---|
| 1 | Ex. 1 | filler | EP | 400 | yes | Solid | — | 0.05 | 0.75 | 1.60 | 0.010 | 0.010 | 0.00 | — | — |
| 2 | Ex. 2 | filler | EP | 400 | yes | Solid | — | 0.04 | 0.85 | 1.80 | 0.015 | 0.012 | 0.20 | — | — |
| 3 | Ex. 3 | filler | EP | 400 | yes | FCW | 15 | 0.05 | 0.75 | 1.60 | 0.010 | 0.010 | 0.00 | — | — |
| 4 | Ex. 4 | filler | EP | 400 | yes | FCW | 15 | 0.05 | 0.75 | 1.15 | 0.010 | 0.010 | 0.00 | — | — |
| 5 | Ex. 5 | filler | EP | 400 | yes | FCW | 15 | 0.05 | 0.75 | 1.15 | 0.010 | 0.010 | 0.18 | — | — |
| 6 | Ex. 6 | filler | EP | 400 | yes | FCW | 15 | 0.05 | 0.75 | 1.60 | 0.010 | 0.010 | 0.10 | — | — |
| 7 | Ex. 7 | filler | EP | 400 | yes | FCW | 15 | 0.05 | 0.75 | 1.60 | 0.010 | 0.010 | 0.15 | — | — |
| 8 | Ex. 8 | filler | EP | 400 | yes | FCW | 15 | 0.05 | 0.75 | 1.60 | 0.010 | 0.010 | 0.00 | — | — |
| 9 | Ex. 9 | filler | EP | 400 | yes | FCW | 15 | 0.05 | 0.75 | 1.60 | 0.010 | 0.010 | 0.00 | 0.0550 | — |
| 10 | Ex. 10 | filler | EP | 400 | yes | FCW | 15 | 0.05 | 0.75 | 1.60 | 0.010 | 0.010 | 0.00 | 0.0015 | — |
| 11 | Ex. 11 | filler | EP | 400 | yes | FCW | 15 | 0.05 | 0.75 | 1.60 | 0.010 | 0.010 | 0.00 | — | 1.15 |
| 12 | Ex. 12 | filler | EP | 400 | yes | FCW | 15 | 0.05 | 0.75 | 1.60 | 0.010 | 0.010 | 0.05 | 0.0100 | — |
| 13 | Ex. 13 | filler | EP | 400 | yes | FCW | 15 | 0.05 | 0.75 | 1.60 | 0.010 | 0.010 | 0.15 | 0.0100 | — |
| 14 | Ex. 14 | filler | EP | 400 | yes | Solid | — | 0.05 | 0.75 | 1.60 | 0.010 | 0.010 | 0.00 | 0.0100 | — |
| 15 | Ex. 15 | filler | EP | 400 | yes | Solid | — | 0.05 | 0.75 | 1.60 | 0.010 | 0.010 | 0.00 | 0.0035 | — |
| 16 | Ex. 16 | filler | EP | 400 | yes | Solid | — | 0.05 | 0.75 | 1.60 | 0.010 | 0.010 | 0.20 | — | — |
| 17 | Ex. 17 | filler | EP | 400 | yes | Solid | — | 0.05 | 0.75 | 1.60 | 0.010 | 0.010 | 0.20 | — | 0.30 |
| 18 | Ex. 18 | filler | EP | 400 | yes | Solid | — | 0.05 | 0.75 | 1.60 | 0.010 | 0.010 | 0.00 | 0.0050 | 0.15 |
| 19 | Ex. 19 | filler | EP | 400 | yes | Solid | — | 0.05 | 0.75 | 1.60 | 0.010 | 0.010 | 0.20 | 0.0030 | — |
| 20 | Ex. 20 | filler | EP | 400 | yes | Solid | — | 0.05 | 0.75 | 1.60 | 0.010 | 0.010 | 0.10 | 0.0030 | — |
| 21 | Ex. 21 | filler | EP | 400 | yes | Solid | — | 0.05 | 0.75 | 1.60 | 0.010 | 0.010 | 0.10 | — | — |
| 22 | Ex. 22 | filler | EP | 400 | yes | FCW | 8 | 0.05 | 0.75 | 1.60 | 0.010 | 0.010 | 0.00 | 0.0100 | — |
| 23 | Ex. 23 | filler | EP | 400 | yes | FCW | 6 | 0.05 | 0.75 | 1.60 | 0.010 | 0.010 | 0.00 | — | — |
| 24 | Ex. 24 | filler | EP | 400 | yes | FCW | 15 | 0.05 | 0.75 | 1.60 | 0.010 | 0.010 | 0.00 | 0.0100 | 0.50 |
| 25 | Ex. 25 | filler | EP | 400 | yes | FCW | 15 | 0.05 | 0.75 | 1.60 | 0.010 | 0.010 | 0.25 | 0.0300 | 0.50 |
| 26 | Ex. 26 | filler | EN | 400 | yes | Solid | — | 0.05 | 0.75 | 1.60 | 0.010 | 0.010 | 0.00 | — | — |
| 27 | Ex. 27 | filler | EN | 400 | yes | FCW | 15 | 0.05 | 0.75 | 1.60 | 0.010 | 0.010 | 0.00 | 0.0100 | — |
| 28 | Ex. 28 | filler | EP | 400 | yes | FCW | 15 | 0.05 | 0.75 | 1.60 | 0.010 | 0.010 | 0.00 | 0.0100 | — |
| 29 | Ex. 29 | filler | EP | 250 | yes | FCW | 20 | 0.05 | 0.30 | 1.00 | 0.005 | 0.005 | 0.00 | 0.0050 | — |
| 30 | Ex. 30 | filler | EP | 800 | yes | FCW | 18 | 0.03 | 0.65 | 2.10 | 0.012 | 0.008 | 0.10 | — | 0.35 |
| 31 | Ex. 31 | filler | EP | 400 | yes | FCW | 15 | 0.05 | 0.75 | 1.60 | 0.010 | 0.010 | 0.00 | 0.0100 | — |
| 32 | Ex. 32 | filler | EP | 400 | yes | FCW | 15 | 0.05 | 0.75 | 2.50 | 0.010 | 0.007 | 0.10 | 0.0100 | — |

| | | Trailing electrode | | | | | |
| No. | Category | Current T (A) | Feeding speed (m/min) | Voltage (V) | Feeding speed ratio T/L (%) | Current ratio T/L (%) | $[Ti]_L + 3[Ti]_T$ |
|---|---|---|---|---|---|---|---|
| 1 | Ex. 1 | 50 | 4.0 | 12 | 22.9 | 14 | 0.00 |
| 2 | Ex. 2 | 50 | 4.0 | 12 | 22.9 | 14 | 0.65 |
| 3 | Ex. 3 | 50 | 6.0 | 12 | 34.3 | 14 | 0.00 |
| 4 | Ex. 4 | 50 | 6.0 | 12 | 34.3 | 14 | 0.07 |
| 5 | Ex. 5 | 50 | 6.0 | 12 | 34.3 | 14 | 0.54 |
| 6 | Ex. 6 | 50 | 6.0 | 12 | 34.3 | 14 | 0.30 |
| 7 | Ex. 7 | 50 | 6.0 | 12 | 34.3 | 14 | 0.46 |
| 8 | Ex. 8 | 50 | 6.0 | 12 | 34.3 | 14 | 0.20 |
| 9 | Ex. 9 | 50 | 6.0 | 12 | 34.3 | 14 | 0.20 |
| 10 | Ex. 10 | 50 | 6.0 | 12 | 34.3 | 14 | 0.20 |
| 11 | Ex. 11 | 50 | 6.0 | 12 | 34.3 | 14 | 0.20 |
| 12 | Ex. 12 | 50 | 6.0 | 12 | 34.3 | 14 | 0.20 |
| 13 | Ex. 13 | 50 | 6.0 | 12 | 34.3 | 14 | 0.65 |
| 14 | Ex. 14 | 50 | 4.0 | 12 | 22.9 | 14 | 0.20 |
| 15 | Ex. 15 | 50 | 4.0 | 12 | 22.9 | 14 | 0.18 |
| 16 | Ex. 16 | 50 | 4.0 | 12 | 22.9 | 14 | 0.80 |
| 17 | Ex. 17 | 50 | 4.0 | 12 | 22.9 | 14 | 0.80 |
| 18 | Ex. 18 | 50 | 4.0 | 12 | 22.9 | 14 | 0.00 |
| 19 | Ex. 19 | 50 | 4.0 | 12 | 22.9 | 14 | 0.60 |
| 20 | Ex. 20 | 50 | 4.0 | 12 | 22.9 | 14 | 0.30 |
| 21 | Ex. 21 | 50 | 4.0 | 12 | 22.9 | 14 | 0.30 |
| 22 | Ex. 22 | 50 | 5.5 | 12 | 31.4 | 14 | 0.20 |
| 23 | Ex. 23 | 50 | 5.5 | 12 | 31.4 | 14 | 0.20 |
| 24 | Ex. 24 | 50 | 6.0 | 12 | 34.3 | 14 | 0.00 |
| 25 | Ex. 25 | 50 | 6.0 | 12 | 34.3 | 14 | 0.75 |
| 26 | Ex. 26 | 50 | 4.0 | 12 | 22.9 | 14 | 0.55 |
| 27 | Ex. 27 | 50 | 6.0 | 12 | 34.3 | 14 | 0.20 |
| 28 | Ex. 28 | 50 | 6.0 | 12 | 34.3 | 14 | 0.20 |
| 29 | Ex. 29 | 100 | 9.0 | 14 | 37.5 | 24 | 0.18 |
| 30 | Ex. 30 | 35 | 4.0 | 11 | 28.6 | 12 | 0.40 |
| 31 | Ex. 31 | 30 | 3.2 | 10 | 29.1 | 12 | 0.20 |
| 32 | Ex. 32 | 85 | 6.0 | 13 | 46.2 | 28 | 0.50 |

Ex.: Example

TABLE 4

| No. | Category | Trailing electrode - Melting form | Polarity | Energizing distance $D_L$ (mm) | Guide lead | Wire type | Flux ratio (%) | C | Si | Mn | P | S | Ti (=$[Ti]_T$) | B |
|---|---|---|---|---|---|---|---|---|---|---|---|---|---|---|
| 33 | Ex. 33 | filler | EP | 1500 | yes | FCW | 16 | 0.05 | 0.05 | 1.02 | 0.010 | 0.003 | 0.05 | 0.0020 |
| 34 | Ex. 34 | filler | EP | 100 | yes | FCW | 22 | 0.05 | 0.25 | 2.00 | 0.010 | 0.040 | 0.00 | 0.0250 |
| 35 | Ex. 35 | filler | AC | 150 | yes | FCW | 15 | 0.05 | 0.75 | 1.60 | 0.010 | 0.010 | 0.00 | — |
| 36 | Ex. 36 | filler | EP | 900 | yes | FCW | 15 | 0.05 | 0.75 | 1.60 | 0.010 | 0.010 | 0.00 | 0.0100 |
| 37 | Ex. 37 | filler | EN | 200 | yes | FCW | 10 | 0.05 | 0.01 | 0.01 | 0.006 | 0.002 | 0.00 | 0.0500 |
| 38 | Ex. 38 | filler | EP | 1000 | yes | FCW | 15 | 0.05 | 0.50 | 0.50 | 0.015 | 0.005 | 0.01 | 0.0035 |
| 39 | Ex. 39 | filler | EP | 300 | yes | FCW | 15 | 0.08 | 0.25 | 1.30 | 0.010 | 0.003 | 0.00 | 0.0150 |
| 40 | Ex. 40 | filler | EP | 400 | yes | FCW | 15 | 0.05 | 0.75 | 1.85 | 0.010 | 0.007 | 0.00 | 0.0010 |
| 41 | C.E. 1 | filler | EP | 400 | yes | FCW | 15 | 0.05 | 0.75 | 1.60 | 0.010 | 0.010 | 0.00 | 0.0100 |
| 42 | C.E. 2 | filler | EP | <u>25</u> | <u>no</u> | FCW | 15 | 0.05 | 0.75 | 1.60 | 0.010 | 0.010 | 0.00 | 0.0100 |
| 43 | C.E. 3 | filler | EP | <u>90</u> | yes | FCW | 15 | 0.05 | 0.75 | 1.60 | 0.010 | 0.010 | 0.00 | 0.0100 |
| 44 | C.E. 4 | filler | EP | <u>90</u> | yes | FCW | 15 | 0.05 | 0.75 | 1.60 | 0.010 | 0.010 | 0.00 | 0.0100 |
| 45 | C.E. 5 | filler | EP | 400 | yes | FCW | 15 | 0.05 | 0.75 | 1.60 | 0.010 | 0.010 | 0.00 | 0.0100 |
| 46 | C.E. 6 | filler | EP | 400 | yes | FCW | 15 | 0.05 | 0.75 | 1.60 | 0.010 | 0.010 | 0.00 | 0.0100 |
| 47 | C.E. 7 | filler | EP | 400 | yes | FCW | 15 | 0.05 | 0.75 | 1.60 | 0.010 | 0.010 | 0.00 | 0.0100 |
| 48 | C.E. 8 | filler | EP | 400 | yes | FCW | 15 | 0.05 | 0.75 | 1.60 | 0.010 | 0.010 | 0.00 | 0.0100 |
| 49 | C.E. 9 | filler | EP | <u>1550</u> | yes | FCW | 15 | 0.05 | 0.75 | 1.60 | 0.010 | 0.010 | 0.00 | 0.0100 |
| 50 | C.E. 10 | filler | EP | 400 | yes | FCW | 15 | 0.05 | 0.75 | 1.60 | 0.010 | 0.010 | 0.00 | 0.0100 |
| 51 | C.E. 11 | filler | EP | 1000 | yes | FCW | 15 | 0.05 | 0.75 | 1.60 | 0.010 | 0.010 | 0.00 | 0.0100 |
| 52 | C.E. 12 | filler | — | <u>no energization</u> | yes | FCW | 15 | 0.05 | 0.75 | 1.60 | 0.010 | 0.010 | 0.00 | 0.0100 |
| 53 | C.E. 13 | <u>no trailing electrode</u> | — | — | — | — | — | — | — | — | — | — | — | — |
| 54 | C.E. 14 | filler | EP | 400 | yes | FCW | 15 | 0.05 | 0.75 | 1.60 | 0.010 | 0.010 | 0.00 | 0.0100 |
| 55 | C.E. 15 | filler | EP | 400 | yes | FCW | 15 | 0.05 | 0.75 | 1.60 | 0.010 | 0.010 | 0.00 | 0.0100 |
| 56 | C.E. 16 | filler | EP | 400 | yes | FCW | 15 | 0.05 | 0.75 | 1.60 | 0.010 | 0.010 | 0.00 | 0.0100 |
| 57 | C.E. 17 | filler | EP | 400 | yes | FCW | 15 | 0.05 | 0.75 | 1.60 | 0.010 | 0.010 | 0.00 | 0.0100 |
| 58 | C.E. 18 | filler | EP | 400 | yes | Solid | — | 0.05 | 0.75 | 1.60 | 0.010 | 0.010 | 0.00 | 0.0100 |
| 59 | C.E. 19 | <u>$CO_2$arc</u> | EP | <u>25</u> | <u>no</u> | FCW | 15 | 0.05 | 0.75 | 1.60 | 0.010 | 0.010 | 0.00 | 0.0100 |
| 60 | C.E. 20 | <u>$CO_2$arc</u> | EP | 125 | <u>no</u> | FCW | 15 | 0.05 | 0.75 | 1.60 | 0.010 | 0.010 | 0.00 | 0.0100 |
| 61 | C.E. 21 | <u>$CO_2$arc</u> | EP | <u>25</u> | <u>no</u> | FCW | 15 | 0.05 | 0.75 | 1.60 | 0.010 | 0.010 | 0.20 | 0.0100 |
| 62 | C.E. 22 | <u>Ar + 20% $CO_2$arc</u> | EP | <u>25</u> | <u>no</u> | Solid | — | 0.05 | 0.75 | 1.60 | 0.010 | 0.010 | 0.15 | — |
| 63 | C.E. 23 | filler | EP | <u>75</u> | yes | FCW | 8 | 0.05 | 0.75 | 1.60 | 0.010 | 0.010 | 0.00 | — |
| 64 | C.E. 24 | filler | EP | 100 | <u>no</u> | FCW | 22 | 0.05 | 0.25 | 2.00 | 0.010 | 0.040 | 0.00 | 0.0250 |
| 65 | C.E. 25 | filler | EN | 200 | yes | FCW | 7 | 0.09 | 0.50 | 1.20 | 0.005 | 0.003 | 0.30 | — |

| No. | Category | Trailing electrode Composition Mo | Current T (A) | Feeding speed (m/min) | Voltage (V) | Feeding speed ratio T/L (%) | Current ratio T/L (%) | $[Ti]_L + 3[Ti]_T$ |
|---|---|---|---|---|---|---|---|---|
| 33 | Ex. 33 | 0.10 | 10 | 6.0 | 13 | 30.0 | 3 | 0.35 |
| 34 | Ex. 34 | — | 125 | 7.5 | 13 | 42.9 | 36 | 0.14 |
| 35 | Ex. 35 | 1.00 | 75 | 6.0 | 12 | 40.0 | 23 | 0.10 |
| 36 | Ex. 36 | — | 150 | 6.8 | 14 | 48.6 | 50 | 0.20 |
| 37 | Ex. 37 | 0.50 | 25 | 3.5 | 11 | 20.0 | 8 | 0.25 |
| 38 | Ex. 38 | 0.25 | 15 | 4.0 | 11 | 27.6 | 5 | 0.13 |
| 39 | Ex. 39 | 0.75 | 100 | 6.0 | 14 | 34.3 | 29 | 0.10 |
| 40 | Ex. 40 | 0.10 | 50 | 6.5 | 12 | 29.5 | 13 | 0.30 |
| 41 | C.E. 1 | — | 25 | 3.0 | 10 | 42.3 | 10 | 0.20 |
| 42 | C.E. 2 | — | 250 | 6.0 | 18 | 34.3 | <u>71</u> | 0.20 |
| 43 | C.E. 3 | — | 175 | 6.0 | 16 | 34.3 | 50 | 0.20 |
| 44 | C.E. 4 | — | 200 | 6.0 | 17 | 34.3 | <u>57</u> | 0.20 |
| 45 | C.E. 5 | — | 50 | 6.0 | 12 | 34.3 | 14 | 0.20 |
| 46 | C.E. 6 | — | 175 | 6.0 | 16 | 34.3 | 50 | 0.20 |
| 47 | C.E. 7 | — | 175 | 3.3 | 16 | <u>18.9</u> | 50 | 0.20 |
| 48 | C.E. 8 | — | 220 | 6.0 | 17 | 34.3 | <u>63</u> | 0.20 |
| 49 | C.E. 9 | — | 10 | 8.0 | 9 | 45.7 | 3 | 0.20 |
| 50 | C.E. 10 | — | <u>8</u> | 4.0 | 9 | 22.9 | 2 | 0.20 |
| 51 | C.E. 11 | — | <u>8</u> | 1.0 | 9 | <u>5.7</u> | 2 | 0.20 |
| 52 | C.E. 12 | — | <u>0</u> | 4.0 | 0 | 22.9 | 0 | 0.20 |
| 53 | C.E. 13 | — | — | — | — | — | — | 0.20 |
| 54 | C.E. 14 | — | 200 | 8.0 | 17 | 45.7 | <u>57</u> | 0.20 |
| 55 | C.E. 15 | — | 50 | 3.2 | 11 | <u>18.3</u> | 14 | 0.20 |
| 56 | C.E. 16 | — | 175 | 10.0 | 16 | <u>57.1</u> | 50 | 0.20 |
| 57 | C.E. 17 | — | 250 | 10.0 | 16 | <u>57.1</u> | <u>71</u> | 0.20 |
| 58 | C.E. 18 | — | 175 | 2.5 | 16 | <u>14.3</u> | 50 | 0.20 |
| 59 | C.E. 19 | — | 170 | 6.0 | 25 | 34.3 | 49 | 0.20 |

TABLE 4-continued

| | | | | | | | | |
|---|---|---|---|---|---|---|---|---|
| 60 | C.E. 20 | — | 120 | 7.0 | 37 | 40.0 | 34 | 0.20 |
| 61 | C.E. 21 | — | 170 | 6.0 | 25 | 34.3 | 49 | 0.80 |
| 62 | C.E. 22 | — | 300 | 14.0 | 36 | <u>80.0</u> | <u>86</u> | 0.65 |
| 63 | C.E. 23 | — | 100 | 6.0 | 13 | 34.3 | 29 | 0.05 |
| 64 | C.E. 24 | — | 125 | 7.5 | 13 | 42.9 | 36 | 0.14 |
| 65 | C.E. 25 | 0.25 | 300 | 12.0 | 19 | 48.0 | <u>71</u> | 1.90 |

Ex.: Example,
C.E.: Comparative Example
* In the melting form, $CO_2$ arc uses gas composed of 100% by volume of $CO_2$ and Ar + 20% $CO_2$ arc uses gas composed of 80% by volume of Ar and 20% by volume of $CO_2$.

In the welding (1), (a) the efficiency of the wire feeding speed by measurement, (b) the amount of spatters generated, and (c) the depth of penetration measured by confirmation of a weld metal cross section were evaluated. In the welding (2), (d) the toughness measured by a −20° C. Charpy impact test (JIS Z3111) of a weld metal and (e) the unmelted wire measured by an ultrasonic flaw detecting test and confirmation of a weld metal cross section were evaluated. The evaluation criteria are as follows.

(a) Efficiency

The welding efficiency relative to the total heat input was evaluated by calculating the length of a wire fed (melted) per 10 mm of weld length at 40 kJ/cm. As shown in No. 53 (Comparative Example 13), regarding the efficiency in a conventional single-electrode arc welding method, the length was 0.90 m. In terms of efficiency improving effect, a length of 1.04 m or more was given an evaluation of "Satisfactory" and a length of 1.14 m or more was given an evaluation of "Good", which were judged as passed. A length of less than 1.04 m was given an evaluation of "Poor", which was judged as failed.

(b) Amount of Spatters Generated

In terms of suppression of the amount of spatters generated, when the amount of spatters generated was 3.0 g/min or less, an evaluation of "Satisfactory" was given. When the amount was 2.0 g/min or less, an evaluation of "Good" was given. "Satisfactory" and "Good" were judged as passed. When the amount was more than 3.0 g/min, an evaluation of "Poor" was given, which was judged as failed.

(c) Depth of Penetration

A maximum depth of penetration of 1 mm or more was given an evaluation of "Satisfactory" and a maximum depth of penetration of 2 mm or more was given an evaluation of "Good", which were judged as passed.

(d) Toughness

Three test pieces were taken from a weld metal and a test was performed to evaluate the toughness. An average value of absorption energies at −20° C. of the three test pieces was employed for evaluation. When the average value was 47 J or more, an evaluation of "Satisfactory" was given. When the average value was 70 J or more, an evaluation of "Good" was given. When the average value was 100 J or more, an evaluation of "Excellent" was given. "Satisfactory", "Good", and "Excellent" were judged as passed. When the average value was less than 47 J, an evaluation of "Poor" was given, which was judged as failed.

(e) Unmelted Wire

When an unmelted wire was not found in a weld metal, an evaluation of "No" was given, which was judged as passed. When an unmelted wire was found in a weld metal, an evaluation of "Yes" was given, which was judged as failed.

Tables 5 and 6 show the results.

TABLE 5

| No. | Category | Welding speed at 40 kJ/cm (cm/min) | Efficiency Length of wire fed (m) | Efficiency Evaluation | Un- melt- ed wire | Amount of spatters generated (g/min) | Amount of spatters generated Evaluation | Toughness Absorption energy (J) | Toughness Evaluation | Depth of penetration (mm) | Depth of penetration Evaluation | Remarks |
|---|---|---|---|---|---|---|---|---|---|---|---|---|
| 1 | Ex. 1 | 20.3 | 1.06 | Satisfactory | No | 2.43 | Satisfactory | 51 | Satisfactory | 3.2 | Good | |
| 2 | Ex. 2 | 19.3 | 1.12 | Satisfactory | No | 2.12 | Satisfactory | 56 | Satisfactory | 1.5 | Satisfactory | |
| 3 | Ex. 3 | 20.3 | 1.16 | Good | No | 2.42 | Satisfactory | 55 | Satisfactory | 2.9 | Good | |
| 4 | Ex. 4 | 19.3 | 1.22 | Good | No | 2.15 | Satisfactory | 62 | Satisfactory | 2.2 | Good | |
| 5 | Ex. 5 | 20.3 | 1.16 | Good | No | 2.30 | Satisfactory | 54 | Satisfactory | 2.9 | Good | |
| 6 | Ex. 6 | 20.3 | 1.16 | Good | No | 2.57 | Satisfactory | 75 | Good | 2.9 | Good | |
| 7 | Ex. 7 | 20.3 | 1.16 | Good | No | 2.06 | Satisfactory | 85 | Good | 1.8 | Satisfactory | |
| 8 | Ex. 8 | 20.3 | 1.16 | Good | No | 1.40 | Good | 94 | Good | 2.9 | Good | |
| 9 | Ex. 9 | 20.3 | 1.16 | Good | No | 1.40 | Good | 145 | Excellent | 2.9 | Good | Small cracking |
| 10 | Ex. 10 | 20.3 | 1.16 | Good | No | 1.40 | Good | 77 | Good | 2.9 | Good | |
| 11 | Ex. 11 | 20.3 | 1.16 | Good | No | 1.40 | Good | 110 | Excellent | 2.9 | Good | Small cracking |
| 12 | Ex. 12 | 20.3 | 1.16 | Good | No | 2.37 | Satisfactory | 134 | Excellent | 2.9 | Good | |
| 13 | Ex. 13 | 20.3 | 1.16 | Good | No | 1.40 | Good | 73 | Good | 2.9 | Good | |
| 14 | Ex. 14 | 20.3 | 1.06 | Satisfactory | No | 1.40 | Good | 139 | Excellent | 3.2 | Good | |
| 15 | Ex. 15 | 20.3 | 1.06 | Satisfactory | No | 1.61 | Good | 145 | Excellent | 3.2 | Good | |
| 16 | Ex. 16 | 20.3 | 1.06 | Satisfactory | No | 1.40 | Good | 50 | Satisfactory | 3.2 | Good | |
| 17 | Ex. 17 | 20.3 | 1.06 | Satisfactory | No | 1.40 | Good | 72 | Good | 3.2 | Good | |
| 18 | Ex. 18 | 20.3 | 1.06 | Satisfactory | No | 2.43 | Satisfactory | 73 | Good | 3.2 | Good | |
| 19 | Ex. 19 | 20.3 | 1.06 | Satisfactory | No | 2.43 | Satisfactory | 75 | Good | 3.2 | Good | |
| 20 | Ex. 20 | 20.3 | 1.06 | Satisfactory | No | 2.43 | Satisfactory | 117 | Excellent | 3.2 | Good | |
| 21 | Ex. 21 | 20.3 | 1.06 | Satisfactory | No | 2.43 | Satisfactory | 84 | Good | 3.2 | Good | |

TABLE 5-continued

| No. | Category | Welding speed at 40 kJ/cm (cm/min) | Efficiency Length of wire fed (m) | Evaluation | Un-melted wire | Amount of spatters generated (g/min) | Evaluation | Toughness Absorption energy (J) | Evaluation | Depth of penetration (mm) | Evaluation | Remarks |
|---|---|---|---|---|---|---|---|---|---|---|---|---|
| 22 | Ex. 22 | 20.3 | 1.13 | Satisfactory | No | 1.40 | Good | 123 | Excellent | 3.0 | Good | |
| 23 | Ex. 23 | 20.3 | 1.13 | Satisfactory | No | 1.40 | Good | 94 | Good | 3.0 | Good | |
| 24 | Ex. 24 | 20.3 | 1.16 | Good | No | 2.42 | Satisfactory | 79 | Good | 2.9 | Good | |
| 25 | Ex. 25 | 20.3 | 1.16 | Good | No | 2.42 | Satisfactory | 80 | Good | 2.9 | Good | |
| 26 | Ex. 26 | 20.3 | 1.06 | Satisfactory | No | 2.95 | Satisfactory | 49 | Satisfactory | 1.6 | Satisfactory | |
| 27 | Ex. 27 | 20.3 | 1.16 | Good | No | 2.50 | Satisfactory | 133 | Excellent | 1.4 | Satisfactory | |
| 28 | Ex. 28 | 20.3 | 1.16 | Good | No | 1.40 | Good | 135 | Excellent | 2.9 | Good | |
| 29 | Ex. 29 | 28.5 | 1.16 | Good | No | 1.01 | Good | 118 | Excellent | 3.6 | Good | |
| 30 | Ex. 30 | 15.0 | 1.20 | Good | No | 0.85 | Good | 134 | Excellent | 1.5 | Satisfactory | |
| 31 | Ex. 31 | 12.5 | 1.14 | Good | No | 1.75 | Good | 123 | Excellent | 1.3 | Satisfactory | |
| 32 | Ex. 32 | 16.5 | 1.15 | Good | No | 1.31 | Good | 139 | Excellent | 2.8 | Good | |

Ex.: Example

TABLE 6

| No. | Category | Welding speed at 40 kJ/cm (cm/min) | Efficiency Length of wire fed (m) | Evaluation | Un-melted wire | Amount of spatters generated (g/min) | Evaluation | Toughness Absorption energy (J) | Evaluation | Depth of penetration (mm) | Evaluation | Remarks |
|---|---|---|---|---|---|---|---|---|---|---|---|---|
| 33 | Ex. 33 | 22.7 | 1.15 | Good | No | 1.90 | Good | 141 | Excellent | 1.2 | Satisfactory | |
| 34 | Ex. 34 | 21.9 | 1.14 | Good | No | 1.66 | Good | 130 | Excellent | 2.5 | Good | |
| 35 | Ex. 35 | 18.2 | 1.16 | Good | No | 1.69 | Good | 114 | Excellent | 2.0 | Good | |
| 36 | Ex. 36 | 18.0 | 1.16 | Good | No | 1.98 | Good | 120 | Excellent | 2.7 | Good | |
| 37 | Ex. 37 | 15.8 | 1.33 | Good | No | 1.90 | Good | 100 | Excellent | 1.1 | Satisfactory | |
| 38 | Ex. 38 | 13.3 | 1.39 | Good | No | 1.19 | Good | 111 | Excellent | 1.5 | Satisfactory | |
| 39 | Ex. 39 | 18.9 | 1.24 | Good | No | 0.85 | Good | 110 | Excellent | 1.1 | Satisfactory | |
| 40 | Ex. 40 | 24.9 | 1.15 | Good | No | 1.29 | Good | 141 | Excellent | 3.1 | Good | |
| 41 | C.E. 1 | 10.5 | 0.97 | Poor | Yes | 1.85 | Good | 122 | Excellent | 1.4 | Satisfactory | |
| 42 | C.E. 2 | 26.2 | 0.90 | Poor | No | 3.68 | Poor | 115 | Excellent | 2.9 | Good | |
| 43 | C.E. 3 | 23.6 | 0.99 | Poor | Yes | 2.90 | Satisfactory | 126 | Excellent | 2.9 | Good | |
| 44 | C.E. 4 | 24.5 | 0.96 | Poor | No | 3.25 | Poor | 128 | Excellent | 3.0 | Good | |
| 45 | C.E. 5 | 20.3 | 1.16 | Good | Yes | 1.25 | Good | 120 | Excellent | 3.5 | Good | |
| 46 | C.E. 6 | 23.6 | 0.99 | Poor | Yes | 2.88 | Satisfactory | 122 | Excellent | 3.5 | Good | |
| 47 | C.E. 7 | 23.6 | 0.88 | Poor | No | 2.68 | Satisfactory | 44 | Poor | 3.8 | Good | |
| 48 | C.E. 8 | 25.0 | 0.94 | Poor | No | 3.33 | Poor | 119 | Excellent | 3.5 | Good | |
| 49 | C.E. 9 | 19.6 | 1.30 | Good | No | 1.34 | Good | 120 | Excellent | 2.6 | Good | Defect of filler wire feeding |
| 50 | C.E. 10 | 19.5 | 1.10 | Satisfactory | Yes | 1.50 | Good | 130 | Excellent | 2.9 | Good | |
| 51 | C.E. 11 | 19.5 | 0.95 | Poor | No | 1.47 | Good | 40 | Poor | 3.4 | Good | |
| 52 | C.E. 12 | 19.4 | 1.11 | Satisfactory | Yes | 1.26 | Good | 104 | Excellent | 2.7 | Good | |
| 53 | C.E. 13 | 19.4 | 0.90 | Poor | No | 1.40 | Good | 46 | Poor | 3.5 | Good | |
| 54 | C.E. 14 | 24.5 | 1.04 | Satisfactory | No | 3.20 | Poor | 118 | Excellent | 2.5 | Good | |
| 55 | C.E. 15 | 20.3 | 1.02 | Poor | No | 1.40 | Good | 43 | Poor | 3.0 | Good | |
| 56 | C.E. 16 | 23.6 | 1.16 | Good | Yes | 2.83 | Satisfactory | 124 | Excellent | 2.7 | Good | |
| 57 | C.E. 17 | 25.4 | 1.08 | Satisfactory | No | 3.45 | Poor | 116 | Excellent | 2.7 | Good | |
| 58 | C.E. 18 | 23.6 | 0.85 | Poor | Yes | 2.89 | Satisfactory | 45 | Poor | 3.1 | Good | |
| 59 | C.E. 19 | 25.8 | 0.91 | Poor | No | 5.50 | Poor | 92 | Good | 3.1 | Good | |
| 60 | C.E. 20 | 26.1 | 0.94 | Poor | No | 4.85 | Poor | 85 | Good | 3.0 | Good | Meandering bead, fusion defect |
| 61 | C.E. 21 | 25.8 | 0.91 | Poor | No | 5.25 | Poor | 100 | Excellent | 3.3 | Good | |
| 62 | C.E. 22 | 34.6 | 0.91 | Poor | No | 4.77 | Poor | 90 | Good | 2.4 | Good | |
| 63 | C.E. 23 | 20.3 | 1.16 | Good | Yes | 2.22 | Satisfactory | 62 | Satisfactory | 2.4 | Good | |
| 64 | C.E. 24 | 21.9 | 1.14 | Good | Yes | 1.66 | Good | 130 | Excellent | 2.8 | Good | Meandering bead, fusion defect |
| 65 | C.E. 25 | 35.0 | 1.06 | Satisfactory | Yes | 3.79 | Poor | 60 | Satisfactory | 1.2 | Satisfactory | |

Ex.: Example,
C.E.: Comparative Example

Nos. 1 to 40 (Examples 1 to 40) are examples that satisfy the requirement of the present invention in terms of the combination of an arc electrode and a filler electrode, the matter concerning a guide lead, the energizing distance $D_L$ of a filler electrode, the distance $D_E$ between electrodes, the current value of a leading electrode, the current ratio between a leading electrode and a trailing electrode, the feeding speed ratio, and the like. As a result, Nos. 1 to 40 are excellent in terms of efficiency, wire feeding property, spattering property, depth of penetration, toughness, quality of a weld metal, and the like. In addition, by limiting the current polarity, the type of wire, and the chemical composition of a wire, such properties can be further improved.

Nos. 41 to 65 (Comparative Examples 1 to 25) are outside the scope of the present invention and thus are examples that do not achieve the objects of the present invention. In particular, Nos. 41 to 57 (Comparative Examples 1 to 18) are examples in which one or more parameters are changed using No. 28 (Example 28) as a standard, which is the most typical Example of the present invention. Therefore, the behaviors caused by the change can be confirmed.

In No. 41, since the electric current of the leading electrode falls below the range specified in the present invention, a molten pool that sufficiently melts the trailing electrode wire with a high feeding speed cannot be formed. Therefore, the feeding speed of the trailing electrode wire needed to be decreased and consequently the welding efficiency relative to the total heat input was decreased. An unmelted wire was left in the weld metal despite the fact that the feeding speed was decreased.

No. 42 is obtained by a conventional two-electrode welding method that uses an arc electrode and a filler electrode. Specifically, a guide lead is not used for a filler electrode serving as a trailing electrode and an energizing tip functions as the guide lead. The energizing distance $D_L$ is 25 mm, which is as short as that of the leading electrode. A high electric current is supplied to an energized filler to melt a filler wire with a high feeding speed. As a result, since the heat input of the trailing electrode was relatively high, the welding efficiency relative to the total heat input was not increased. In addition, since the filler energizing current was high, an influence of magnetic interference was exerted on the arc of the leading electrode and thus the amount of spatters was increased.

In No. 43, the energizing distance $D_L$ of the trailing electrode is short and outside the range specified in the present invention. Since the amount of electric resistance heating was small, the filler energizing current was increased to the upper limit of the range specified in the present invention. However, the trailing electrode wire was not completely melted and an unmelted wire was generated. In addition, the welding efficiency relative to the total heat input was decreased.

No. 44 had the same configuration as that of No. 43 and the energizing current was increased to a value higher than the upper limit of the range specified in the present invention to eliminate the unmelted trailing electrode wire. As a result, the unmelted wire was eliminated, but the welding efficiency relative to the total heat input was further decreased. In addition, an influence of magnetic interference was exerted on the arc of the leading electrode and thus the amount of spatters was increased.

In No. 45, the distance $D_E$ between electrodes exceeds the range specified in the present invention. Therefore, the trailing electrode wire was not completely melted due to a decrease in the radiant heat from the arc to the trailing electrode wire and a decrease in the temperature of a molten pool at a position where the trailing electrode wire entered, resulting in the generation of an unmelted wire.

In No. 46, the filler energizing current was increased to the upper limit specified in the present invention to address the problem of No. 45. However, the trailing electrode wire was not completely melted even in this case and an unmelted wire was generated. To make matters worse, the welding efficiency relative to the total heat input was further decreased.

In No. 47, the feeding speed of the trailing electrode wire was decreased to address the problem of an unmelted trailing electrode wire in Nos. 45 and 46. Consequently, the problem was solved. However, the welding efficiency relative to the total heat input was further decreased compared with No. 46. In addition, the feeding speed ratio fell below the range specified in the present invention and thus the cooling effect caused by inserting the trailing electrode into a molten pool was decreased. Therefore, the Charpy absorption energy was decreased with increasing the size of crystal grains.

In No. 48, the energizing current supplied to the trailing electrode was increased to a value higher than the upper limit of the range specified in the present invention to address the problem of an unmelted trailing electrode wire in Nos. 45 and 46. Consequently, the problem was solved. However, the welding efficiency relative to the total heat input was further decreased, and an influence of magnetic interference was exerted on the arc of the leading electrode and thus the amount of spatters was increased.

In No. 49, the energizing distance $D_L$ of the filler electrode is increased to a distance larger than the range specified in the present invention. Therefore, the amount of electric resistance heating was excessively increased and thus the rigidity of the wire itself was lost, buckling deformation was caused, and a feeding defect was caused. To address such a problem, the filler energizing current was decreased to 10 A, which was the lower limit at which energization could be stably performed, but the feeding defect was not solved. Herein, the data concerning a weld metal and the like are values obtained by repeatedly perform rework.

In No. 50, the filler energizing current is excessively low. The filler feeding speed was decreased to near the lower limit in terms of the welding efficiency relative to the total heat input. However, the heating effect caused by energization was insufficient and an unmelted wire was generated.

In No. 51, the energizing distance $D_L$ of the filler electrode was increased and the filler feeding speed was decreased to address the problem of the unmelted wire in No. 50. As a result, the problem was solved, but the welding efficiency relative to the total heat input was decreased. In addition, the feeding speed ratio fell below the range specified in the present invention and thus the cooling effect caused by inserting the trailing electrode into a molten pool was decreased. Therefore, the Charpy absorption energy was decreased with increasing the size of crystal grains.

In No. 52, an electric current is not supplied to the filler electrode serving as the trailing electrode. Although a welding machine and an electric wiring system for one electrode is advantageously not required, an unmelted wire was generated in an amount larger than that of No. 50 in which energization was slightly performed.

No. 53 is obtained by a method in which a trailing electrode is not used, that is, a typical single-electrode arc welding method. Obviously, there was no effect of improving the welding efficiency or no effect of improving the Charpy absorption energy. In No. 54, the current ratio of the trailing electrode to the leading electrode exceeds the range specified in the present invention. Thus, even if the feeding speed of the trailing electrode wire was increased, an unmelted wire was not generated. However, an influence of magnetic interference was exerted on the arc of the leading electrode and thus the amount of spatters was increased.

In No. 55, the feeding speed ratio of the trailing electrode to the leading electrode falls below the range specified in the present invention. The welding efficiency relative to the total heat input was low due to the insufficient feeding amount, and the cooling effect caused by inserting the trailing electrode into a molten pool was decreased. Therefore, the Charpy absorption energy was decreased with increasing the size of crystal grains. In No. 56, the feeding speed ratio of the trailing electrode to the leading electrode exceeds the range specified in the present invention. Therefore, the current ratio of the energized filler was increased to the upper limit specified in the present invention, but the heating effect caused by energization was insufficient and an unmelted wire was generated.

In No. 57, the energizing current was increased to a value higher than the upper limit of the range specified in the present invention to address the problem of the unmelted wire in No. 56. As a result, the problem was solved, but an influence of magnetic interference was exerted on the arc of the leading electrode and thus the amount of spatters was increased.

No. 58 is similar to No. 47, but the wire of the trailing electrode is a solid wire. The distance $D_E$ between electrodes exceeds the range specified in the present invention and thus the melting property of the trailing electrode wire is poor. Therefore, the feeding speed of the trailing electrode wire was decreased to a speed lower than the range specified in the present invention, but the unmelted wire was still generated. This means that a solid wire is inferior to a flux-cored wire when used as the filler electrode wire. The welding efficiency relative to the total heat input was low and the feeding speed ratio fell below the range specified in the present invention. Consequently, the cooling effect caused by inserting the trailing electrode into a molten pool was decreased, and thus the Charpy absorption energy was decreased with increasing the size of crystal grains.

No. 59 is obtained by a typical two-electrode tandem arc welding method in which, instead of a filler electrode, an arc electrode is used as the trailing electrode. Since both electrodes were arc electrodes, both electrodes were mutually subjected to arc interference and spatters were generated from both the electrodes. As a result, an extremely large amount of spatters was generated in total. In addition, since a high voltage needs to be supplied to an arc electrode compared with a filler electrode, the heat input became high even at the same wire feeding speed. Consequently, the welding efficiency relative to the total heat input was decreased.

In No. 60, to address the problem of No. 59, the energizing distance $D_L$ is increased by raising the position of an energizing tip in a typical two-electrode tandem arc welding method. Consequently, the heating effect is increased and the electric current is decreased. The amount of spatters was decreased to some degree because of a reduction in arc interference, but the decrease in the amount of spatters was not sufficient. The welding efficiency relative to the total heat input was slightly improved, but was not sufficiently high. In addition, since the position of the energizing tip was simply raised, the guiding function of fixing a wire target position was lost and a bend of the wire could not be corrected, resulting in the generation of a meandering bead. In the multilayer welding, an upper sheet did not fit the shape of a weld bead of a lower sheet and a fusion defect was caused.

No. 61 has the same configuration as that of No. 59, but a large amount of Ti is added to a wire of the arc electrode serving as the trailing electrode. Therefore, the amount of Ti exceeds a value of $[Ti]_L + 3 \cdot [Ti]_L$ of 0.10 to 0.50 specified in the present invention. The Charpy absorption energy is improved compared with No. 59 having a low value of $[Ti]_L + 3 \cdot [Ti]_T$. However, it is clear from the present invention in which the trailing electrode is a filler electrode that, when the amount of Ti exceeds the above-described range, the toughness decreases. Thus, it can be understood that a method in which both electrodes are arc electrodes is different from the two-electrode method of the present invention in which the trailing electrode is a filler electrode in terms of the characteristics concerning the amount of Ti in a wire. Even if Ti is added to a wire of an arc electrode serving as the trailing electrode, the amount of spatters generated is hardly decreased and also the welding efficiency relative to the total heat input is hardly improved.

No. 62 is also obtained by a conventional two-electrode tandem arc welding method under the welding conditions that are often industrially employed. That is, the shield gas composition is 80% by volume of Ar+20% by volume of $CO_2$, both electrodes are solid wires, and the electric currents of the leading electrode and trailing electrode are substantially the same. An arc electrode has an advantage of not generating an unmelted wire even at a high wire feeding speed. However, the amount of spatters generated was large because both electrodes were arc electrodes and the current ratio was high. In addition, the welding efficiency relative to the total heat input was low because an arc electrode has low thermal efficiency.

In No. 63, the energizing distance $D_L$ falls below the range specified in the present invention. Similarly to No. 43, priority was placed on the filler energizing current and feeding speed to satisfy the welding efficiency relative to the total heat input, but an unmelted wire was significantly generated due to lack of electric resistance heating.

In No. 64, a guide lead or guide tip having no energizing function is removed in the trailing electrode. That is, the trailing electrode wire protruding from the energizing tip reaches a molten pool without being guided. Since the trailing electrode wire was not guided despite the fact that the energizing distance $D_L$ was long, a bend of the wire could not be corrected, resulting in the generation of a meandering bead. In the multilayer welding, an upper sheet did not fit the shape of a weld bead of a lower sheet and a fusion defect was caused. In addition, the trailing electrode wire was not completely melted when the trailing electrode wire did not enter the center of the molten pool, resulting in the generation of an unmelted wire.

In No. 65, a high electric current is supplied and a wire is fed at high speed in both the leading electrode and trailing electrode, but the distance $D_E$ between electrodes and the current ratio are excessively large. Therefore, the trailing electrode wire was not completely melted due to a decrease in the radiant heat from the arc to the trailing electrode wire and a decrease in the temperature of a molten pool at a position where the trailing electrode wire entered, resulting in the generation of an unmelted wire. An influence of magnetic interference was exerted on the arc of the leading electrode and thus the amount of spatters was increased.

As described above, the present invention provides a two-electrode welding method that can address the problems posed in a conventional two-electrode arc welding method, the problems including (a) an excessive amount of spatters generated, (b) a difficulty in decreasing the distance between electrodes, (c) a contradictory relationship between low heat input and high deposition efficiency, and (d) an improvement in the mechanical properties of a weld metal. Therefore, the two-electrode welding method practically and industrially has a high value. Specifically, various conventional problems can be solved by specifying the melting method of two electrodes, the distance between electrodes, the energizing distance of a filler electrode, the electric current ratio, the polarity, and the like. Furthermore, more desirable melting and weld quality can be achieved by specifying the type and composition of wires in both electrodes.

The present invention has been described in detail with reference to the embodiments and Examples. However, the scope of the present invention is not limited to the above description, and the scope of right should be broadly interpreted based on the description of Claims. In addition, it is apparent that various changes, modifications, and alterations can be made within the spirit and scope of the present invention on the basis of the foregoing description.

What is claimed is:

1. A two-electrode welding method that uses two wire-shaped consumable electrodes to which an electric current is supplied from two independent welding sources, the method comprising:

forming a molten pool with a leading electrode wire of a leading electrode that precedes in a welding direction; and inserting a trailing electrode wire of a trailing electrode that succeeds in the welding direction into the molten pool to form a single molten pool, wherein the leading electrode is used to perform gas-shielded arc welding in which the leading electrode wire is melted by generating an arc;

the trailing electrode is an energized filler in which the temperature of the trailing electrode wire is increased by electric resistance heating through energization without generating an arc, and after the trailing electrode wire is inserted into the molten pool, the trailing electrode wire is melted through heat conduction of the molten pool;

the trailing electrode includes a guide lead or guide tip having no energizing function but only a function of determining a position of the molten pool into which the trailing electrode wire is to be inserted;

the trailing electrode wire protrudes from the guide lead or guide tip and is energized from an energizing tip disposed at a position on a welding machine side of the guide lead or guide tip;

a distance $D_L$ between a welding surface and an end of the energizing tip closest to the welding surface is at least 100 mm and no more than 1500 mm;

a distance $D_E$ between the leading electrode and the trailing electrode on the welding surface is 10 mm or less;

an electric current of the leading electrode is at least 250 A;

an electric current of the trailing electrode is at least 10 A and no more than 50% of the electric current of the leading electrode; and a feeding speed of the trailing electrode wire is at least 20% and no more than 50% of a feeding speed of the leading electrode wire.

2. The method according to claim 1, wherein current polarities of both the leading electrode wire and the trailing electrode wire are positive or negative with respect to a base metal.

3. The method according to claim 1 or 2, wherein the leading electrode wire is a solid wire or a flux-cored wire, the trailing electrode wire is a flux-cored wire, and a flux ratio of the trailing electrode wire is at least 10% by mass.

4. The method according to any one of claim 1 or 2, wherein, assuming that a Ti amount (% by mass) in a composition of the leading electrode wire is represented by $[Ti]_L$ and a Ti amount (% by mass) in a composition of the trailing electrode wire is represented by $[Ti]_T$, a value of $[Ti]_L + 3[Ti]_T$ is at least 0.10 and no more than 0.50.

5. The method according to claim 4, wherein the $[Ti]_L$ is at least 0.10% and no more than 0.50% by mass.

6. The method according to any one of claim 1 or 2, wherein the trailing electrode wire contains at least one of B: at least 0.0020% and no more than 0.0500% by mass and Mo: at least 0.10% and no more than 1.00% by mass relative to the total mass of the trailing electrode wire.

* * * * *